US006878473B2

(12) United States Patent
Yamauchi et al.

(10) Patent No.: US 6,878,473 B2
(45) Date of Patent: Apr. 12, 2005

(54) FUEL CELL POWER GENERATING APPARATUS, AND OPERATING METHOD AND COMBINED BATTERY OF FUEL CELL POWER GENERATING APPARATUS

(75) Inventors: Takashi Yamauchi, Yokohama (JP); Masahiro Takashita, Kawasaki (JP); Masato Akita, Yokohama (JP); Norihiro Tomimatsu, Kawasaki (JP); Yoshihiko Nakano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 10/135,375

(22) Filed: May 1, 2002

(65) Prior Publication Data

US 2002/0187374 A1 Dec. 12, 2002

(30) Foreign Application Priority Data

May 2, 2001 (JP) ........................................ 2001-135169

(51) Int. Cl.$^7$ ............................................... H01M 8/04
(52) U.S. Cl. ......................................................... 429/17
(58) Field of Search .......................................... 429/17

(56) References Cited

U.S. PATENT DOCUMENTS

| 4,612,261 | A | * | 9/1986 | Tsukui et al. | .................. 429/13 |
| 5,284,878 | A | * | 2/1994 | Studer et al. | ................ 518/700 |
| 6,613,464 | B1 | * | 9/2003 | Wilkinson et al. | ............. 429/13 |

FOREIGN PATENT DOCUMENTS

| JP | 2001291523 | * | 10/2001 | ............ H01M/8/04 |

OTHER PUBLICATIONS

Xiaoming Ren, et al. "Methanol Transport Through Nafion Membranes Electro–Osmotic Drag Effects on Potential Step Measurements." Journal of the Electrochemical Society, 147(2), 2000, pp. 466–474.
R. Ramkumar, et al. "Development of Porous Carbon Electrodes for Direct Methanol Fuel Cells." Journal of Power Sources 69, 1997, pp. 75–80.
R. Schlögl, "The Significance of Convection in Transport Processes Across Porous Membranes." Discussions of the Farady Society, No. 21, 1956, pp. 46–52.
Dawn M. Bernardi, et al. "A Mathematical Model of the Solid–Polymer–Electrolyte Fuel Cell." The Electrochemical Society, Inc. vol. 139, No. 9, Sep. 1992, pp. 2477–2491.
K. Scott, et al. "Performance and Modelling of a Direct Methanol Solid Polymer Electrolyte Fuel Cell." Journal of Power Sources 65, 1997, pp. 159–171.
S. C. Kelley, et al. "A Miniature Methanol/Air Polymer Electrolyte Fuel Cell." Electrochemical and Solid–State Letters 3 (9), 2000, pp. 407–409.

* cited by examiner

*Primary Examiner*—Mark Ruthkosky
(74) *Attorney, Agent, or Firm*—Oblon, Spivak, McClelland, Maier & Neustadt, P.C.

(57) ABSTRACT

A fuel cell power generating apparatus comprises an electromotive section, a container, a methanol aqueous solution recovery mechanism, and flow rate controller controlling the flow rate $J_m$ (mL/min) which controls the flow rate $J_m$ (mL/min) at which the methanol aqueous solution is supplied from the container, in accordance with an evaluated concentration of the methanol aqueous solution in the container, wherein the fuel cell power generating apparatus satisfies conditions (1) to (3) given below:

$2 \leq C_m^0 \leq 5$        (1)

$L \geq 40$        (2)

$N \cdot 0.65/L \cdot S \leq J_m \leq N \cdot 5.2/L \cdot S$        (3).

18 Claims, 14 Drawing Sheets

US 6,878,473 B2

FUEL CELL POWER GENERATING APPARATUS, AND OPERATING METHOD AND COMBINED BATTERY OF FUEL CELL POWER GENERATING APPARATUS

CROSS-REFERENCE TO RELATED APPLICATIONS

This application is based upon and claims the benefit of priority from the prior Japanese Patent Application No. 2001-135169, filed May 2, 2001, the entire contents of which are incorporated herein by reference.

BACKGROUND OF THE INVENTION

1. Field of the Invention

The present invention relates to a fuel cell power generating apparatus, the operating method of a fuel cell power generating apparatus, and the combined battery of a fuel cell power generating apparatus.

2. Description of the Related Art

A high performance secondary battery and a fuel cell attract much attention as a power source of a portable electronic appliance supporting an information society and as a key element of an electric automobile and a power storing system for coping with air pollution and "global warming". Particularly, a PEM (PEFC, solid electrolyte fuel cell) using hydrogen and oxygen as a fuel is considered to be a hopeful application of a secondary battery and fuel cell for electric automobiles. To be more specific, the fuel cell is considered to be adapted for an electric automobile because a high output can be obtained by using clean energies of hydrogen and oxygen, and because the output can be restored by replenishing the fuel. However, a fuel cell is defective in that the output is lowered relative to the large change in the load current, making it difficult to generate the power required for sudden acceleration, in an electric automobile. On the other hand, an electric automobile utilizing a lithium ion secondary battery alone for the running has been put to practical use. However, it is considered difficult to use a lithium ion secondary battery alone as the power source of an electric automobile because, further improvements in terms of safety and output are required, in that the output cannot be restored sufficiently even if the electrolyte is replenished. Under the circumstances, a hybrid battery (combined battery) utilizing the features of both a lithium ion secondary battery and a fuel cell has become important for providing a satisfactory electric automobile. Further, in order to achieve a reduction in volume of the fuel used in PEM, a method using a compressed hydrogen (250 atm), a liquid hydrogen, or a hydrogen storage alloy is being studied. Under the circumstances, a direct methanol fuel cell (DMFC), in which protons are directly extracted from methanol for performing power generation, attracts attention, although the output of a DMFC is lower than that of a PEM. Further, since a DMFC permits reducing the volume of the fuel, it is considered possible to apply a DMFC (direct methanol fuel cell) to a portable electronic appliance, leading to high expectations in the applications of DMFCs in various fields.

FIG. 1 schematically shows the construction of a typical direct methanol fuel cell. The electromotive section of the direct methanol fuel cell comprises an anode electrode including an anode current collector 1 and an anode catalyst layer 2, a cathode electrode including a cathode current collector 3 and a cathode catalyst layer 4, and an electrolyte membrane 5 interposed between the anode electrode and the cathode electrode. An anode fluid channel plate 6 is arranged on the side of the anode current collector 1. As shown in FIG. 2, an anode fluid channel 9 having a methanol supply port 7 and a methanol discharge port 8 is formed on the anode fluid channel plate 6. A methanol aqueous solution container 10 housing a methanol aqueous solution is connected to the methanol supply port 7 with a pump 11 interposed therebetween. On the other hand, a cathode fluid channel plate 12 is arranged on the side of the cathode current collector 3. A cathode fluid channel 15 including an oxidizing agent supply port 13 and an oxidizing agent discharge port 14 is formed in the cathode fluid channel plate 12. An oxidizing agent supply mechanism 16 which supplies an oxidizing agent such as air is connected to the oxidizing agent supply port 13.

The electrolyte membrane 5 is formed of, for example, a Nafion® membrane having a high proton conductivity. On the other hand, the catalyst used in the anode catalyst layer 2 is formed of, for example, PtRu low in poisoning, and the catalyst used in the cathode catalyst layer is formed of, for example, Pt.

In the direct methanol fuel cell of the construction described above, a methanol aqueous solution is supplied to the anode catalyst layer 2 so as to bring about a catalytic reaction for generating protons. The protons thus generated are migrated though the electrolyte membrane 5 so as to carry out a reaction with oxygen supplied to the cathode catalyst layer 4 in the presence of the catalyst so as to perform the required power generation.

In order to improve the output of the direct methanol fuel cell, it is necessary to maintain a high electromotive force to a high load current. In order to obtain a high load current, it is necessary to increase the amount of methanol supplied to the anode catalyst layer per unit time. However, since the methanol aqueous solution passes through the Nafion® membrane, the methanol aqueous solution that was not used in the reaction carried out within the anode catalyst layer is migrated to reach the cathode catalyst layer. As a result, the reaction equal to that carried out in the anode catalyst layer is carried out in the cathode catalyst layer, which generates a back electromotive force, which is a cross-over overvoltage that brings about a problem that the electromotive force of the direct methanol fuel cell is decreased. This cross-over overvoltage is rendered serious with an increase in the methanol concentration. If a methanol aqueous solution having a concentration exceeding 5M is supplied to the anode catalyst layer, the output of the direct methanol fuel cell is markedly decreased. It is also desirable to set the concentration of the methanol aqueous solution at a level not higher than 5M in order to suppress the deterioration of the electrolyte membrane such as a Nafion® membrane. Such being the situation, it is desirable to set the concentration of the aqueous solution of methanol used as a fuel at a level not higher than 5M in order to operate the direct methanol fuel cell.

As a method of lowering the cross-over overvoltage, it is conceivable to have all the methanol supplied to the anode catalyst layer consumed in the anode catalyst layer so as to prevent methanol from being migrated into the cathode catalyst layer. For allowing all the methanol consumed in the anode catalyst layer, it is conceivable to increase the catalytic activity in the anode catalyst layer or to increase the amount of the catalyst supported by the carrier. However, it is impossible to increase the catalytic activity or to increase amount the supported catalyst in the anode catalyst layer used nowadays. Also, an electrolyte membrane inhibiting the migration of the methanol solution that is not used in the anode catalyst layer is also being developed. However, the proton conductivity of the electrolyte membrane is rendered poor, which lowers the output in many cases. Such being the situation, it is desirable to lower the concentration of the methanol aqueous solution used as a fuel in order to lower the cross-over overvoltage. However, if a fuel of a low concentration is used, it is necessary to enlarge the fuel container, resulting in failure to utilize sufficiently the feature of the direct methanol fuel cell.

As described above with reference to FIG. 1, the ordinary direct methanol fuel cell is constructed such that a methanol aqueous solution is supplied by the pump 11 to the anode fluid channel plate 6. Also, as shown in FIG. 2, the methanol aqueous solution supplied by the pump 11 flows along the groove portion (anode fluid channel 9) of the fluid channel plate 6 via the methanol supply port (inlet) 7 of the anode fluid channel plate 6. The convex portion of the fluid channel plate 6 is in contact with the anode current collector 1 formed of an anode carbon paper such that the methanol aqueous solution flowing through the anode fluid channel 9 permeates into the anode current collector 1, which supplies the methanol aqueous solution into the anode catalyst layer 2.

However, all the methanol aqueous solution flowing along the anode fluid channel plate 6 does not necessarily permeate into the anode current collector 1. In practice, the methanol aqueous solution is partly discharged to the outside through the methanol discharge port (outlet) 8 of the fluid channel plate 6. It follows that the utilization efficiency of the methanol aqueous solution in the container 10 is generally low. For improving the utilization efficiency, it is attempted to improve the construction of the fluid channel plate. However, a high improvement in the utilization efficiency has not yet been achieved. It is also conceivable to assemble a system that the methanol aqueous solution discharged through the methanol discharge port (outlet) 8 of the anode fluid channel plate 6 is returned to the container 10. However, methanol and water are consumed at a ratio of 1:1 within the anode catalyst layer 2. It follows that, if the methanol aqueous solution discharged through the anode fluid channel plate 6 is brought back to the container 10, the concentration of the methanol aqueous solution within the container 10 is gradually lowered. As a result, a methanol shortage is brought about inside the battery, giving rise to the problem that the electromotive force is rapidly decreased.

As described above, it is desirable to use a methanol aqueous solution having a concentration not higher than 5M. However, if a dilute methanol aqueous solution is used as a fuel, it is necessary to increase the volume of the container. In addition, the methanol shortage tends to take place for carrying out the reaction inside the cell. It follows that it is necessary to supply promptly the methanol aqueous solution from within the methanol aqueous solution container. If such an operation is carried out, it is certainly possible to increase the output of the fuel cell because the cross-over overvoltage can be lowered. However, the pump output for supplying methanol is also increased, giving rise to the problem that the output of the power generating apparatus including the fuel cell and the pump is rendered low.

As described above, contradictory situations are brought about. Specifically, it is desirable in view of the fuel supply to supply a thick methanol aqueous solution at a low flowing speed. In view of the output of the power generating apparatus, however, it is desirable to supply a thin methanol aqueous solution at a high flowing speed. Such being the situation, in order to reduce the volume of the fuel container and to obtain a high output, it is necessary to supply a methanol aqueous solution of an optimum concentration at an optimum flowing speed. The optimum concentration and the optimum flowing speed of the methanol aqueous solution are also dependent on the construction of the electromotive force of the fuel cell and, thus, it is very difficult to research the optimum concentration and the optimum flowing speed of the methanol aqueous solution. As a matter of fact, the optimum concentration and the optimum flowing speed of the methanol aqueous solution are not yet understood.

BRIEF SUMMARY OF THE INVENTION

An object of the present invention is to provide a fuel cell power generating apparatus and a combined battery, which permit improving the output of the fuel cell power generating apparatus when the initial concentration of a methanol aqueous solution in the container is set at a high level.

Another object of the present invention is to provide an operating method of a fuel cell power generating apparatus, which permits improving the power density when the initial concentration of the methanol aqueous solution in the container is set to fall within a range of between 2 and 5 mol/L.

A further object of the present invention is to provide a fuel cell power generating apparatus and a combined battery, which are excellent in both fuel utilization factor and energy conversion efficiency.

According to a first aspect of the present invention, there is provided a first fuel cell power generating apparatus of the present invention comprises:

an electromotive section comprising at least one electromotive section unit, the at least one electromotive section unit including an anode electrode comprising an anode catalyst layer, a cathode electrode and an electrolyte membrane arranged between the anode electrode and the cathode electrode;

a container containing a methanol aqueous solution;

an anode fluid channel through which the methanol aqueous solution is supplied to the anode electrode;

a methanol aqueous solution recovery mechanism configured to bring back the excess portion of the methanol aqueous solution supplied to the anode fluid channel to the container to recover the excess portion therein; and a flow rate controller which controls the flow rate $J_m$ (mL/min) at which the methanol aqueous solution is supplied from the container, in accordance with an evaluated concentration of the methanol aqueous solution within the container, the evaluated concentration being obtained by evaluating the record of the change with operating time in the load current of the fuel cell power generating apparatus, wherein the fuel cell power generating apparatus satisfies conditions (1) to (3) given below:

$$2 \leq C_m^0 \leq 5 \quad (1)$$

$$L \geq 40 \quad (2)$$

$$N \cdot 0.65/L \cdot S \leq J_m \leq N \cdot 5.2/L \cdot S \quad (3)$$

where $C_m^0$ represents the initial concentration (M) of the methanol aqueous solution in the container, L represents the thickness ($\mu$m) of the anode catalyst layer, S represents the reaction area (cm$^2$) of the anode catalyst layer, and N represents the number of the electromotive section units.

According to a second aspect of the present invention, there is provided a second fuel cell power generating apparatus of the present invention comprises:

an electromotive section comprising at least one electromotive section unit, the at least one electromotive section unit including an anode electrode comprising an anode catalyst layer having a thickness not smaller than 40 μm, a cathode electrode and an electrolyte membrane arranged between the anode electrode and the cathode electrode; and a container containing a methanol aqueous solution having a concentration falling within a range of between 2M and 5M, wherein the flow rate $J_m$ (mL/min) at which the methanol aqueous solution is supplied from the container falls within a range defined by condition (4) given below:

$$N \cdot 1.5 \times 10^{-5} \cdot L \cdot S \leq J_m \leq N \cdot 0.65/L \cdot S \quad (4)$$

where L denotes the thickness (μm) of the anode catalyst layer, S denotes the reaction area (cm²) of the anode catalyst layer, and N denotes the number of the electromotive section units.

According to a third aspect of the present invention, there is provided a combined battery comprises a first fuel cell power generating apparatus or a second fuel cell power generating apparatus of the present invention given above and a nonaqueous electrolyte secondary battery electrically connected to the fuel cell power generating apparatus.

Further, the present invention provides a method of operating a fuel cell power generating apparatus comprising at least one electromotive section unit, the at least one electromotive section unit including an anode electrode comprising an anode catalyst layer having a thickness not smaller than 40 μm, a cathode electrode and an electrolyte membrane arranged between the anode electrode and the cathode electrode; a container containing a methanol aqueous solution having an initial concentration of 2M to 5M; an anode fluid channel through which the methanol aqueous solution is supplied to the anode electrode; a methanol aqueous solution recovery mechanism configured to bring back the excess portion of the methanol aqueous solution supplied to the anode fluid channel to the container to recover the excess portion therein; and a methanol concentration evaluating mechanism which evaluates the concentration of the methanol aqueous solution in the container from the record of the change with operating time in the load current of the fuel cell power generating apparatus, the method comprising:

performing a first power generating operation to obtain electric power from the fuel cell power generating apparatus when the evaluated concentration falls within a range of between 2M and 5M while maintaining the flow rate $J_m$ (mL/min) at which the methanol aqueous solution is supplied from the container at a constant value falling within a range defined by condition (3) given below; and performing a second power generating operation to obtain electric power from the fuel cell power generating apparatus when the evaluated concentration is lowered to a value lower than 2M while increasing the flow rate $J_m$ (mL/min) within the range defined by condition (3):

$$N \cdot 0.65/L \cdot S \leq J_m \leq N \cdot 5.2/L \cdot S \quad (3)$$

where L denotes the thickness of the anode catalyst layer, S denotes the reaction area (cm²) of the anode catalyst layer, and N denotes the number of the electromotive section units.

DETAILED DESCRIPTION OF THE INVENTION

Figure 1:
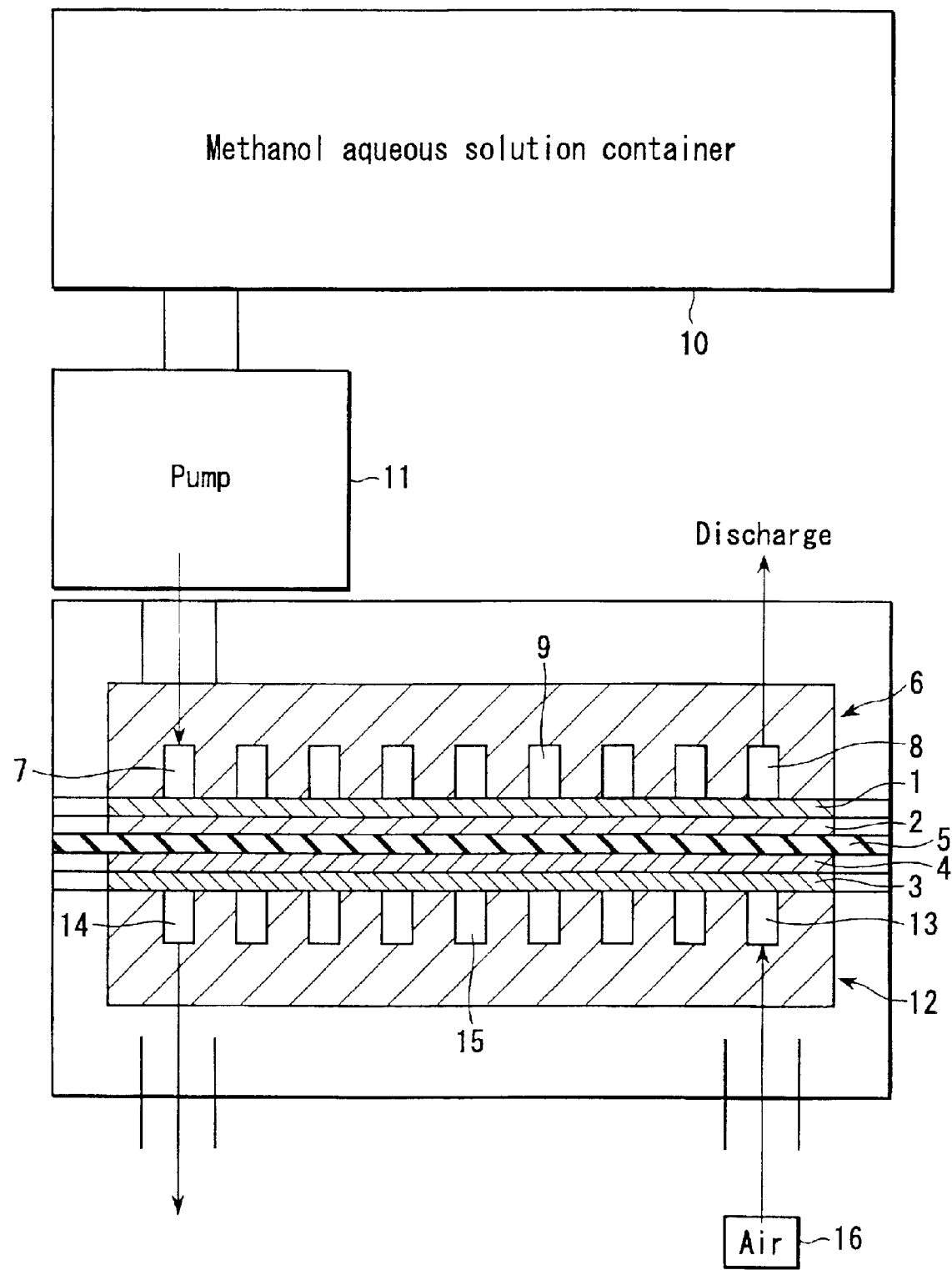
FIG. 1 is a schematic diagram showing the construction of a typical direct methanol fuel cell.

In order to make optimum the concentration of the methanol aqueous solution supplied to the direct methanol fuel cell and the flowing speed of the methanol aqueous solution, the present inventor has prepared a simulator and systematically examined the output characteristics so as to arrive at the conditions (1) to (3) referred to previously.

Several equations have already been proposed in respect of the methanol conduction, the proton conduction and the conduction of an oxidizing agent in the electromotive section, as disclosed in, for example, "J. Power Source, 65, No. 1–2, 159 (1997)", "Discussions of the Faraday Society, No. 21 (1956)", and "J. Electrochem. Soc., 39, No. 9, 2477 (1992)". These equations have been used in arriving at the present invention. Specifically, the catalytic reaction performed on the electrode can be described by the Butler-Volmer equation of numerical formula 1 given below:

Numerical Formula (1):

$$\frac{di}{dz} = 2ai_0 \sinh\left(\frac{\alpha F}{kT}(\phi_{H^+} - \phi_{e^-})\right)$$

where $\alpha$ represents the number of electrons involved in the catalytic reaction. Two electrons were involved in the catalytic reaction performed in the cathode catalyst layer, and three electrons were involved in the catalytic reaction performed on the anode electrode. Also, concerning the product between the effective catalyst surface area "a" and the exchange current $i_0$, used were the values of $10^{-5}$ (70° C.) for the cathode catalyst layer and 6.25 exp(8420 (1/333–1/T)) for the anode catalyst layer, as in the general case. Incidentally, all the calculations for the present invention were carried out on the basis that the operating temperature of the battery was assumed to be 70° C. as generally considered, because the catalytic activity is strongly dependent on the temperature. Also, the expression $(\phi_{H+} - \phi_{e-})$ represents the difference in potential between the electron and the proton. Further, concerning the conduction of methanol, use was the equation where the Nernst-Planck equation accompanying the convection term and the fluid dynamic Schlögl equation are simultaneously taken into consideration.

Numerical Formula (2):

$$\frac{d}{dz}\left(-D_m \frac{\partial C_m}{\partial z} + \varepsilon(\gamma C_m(z))2.5 \frac{i(z)}{F}\right) = \frac{1}{6F}\frac{di}{dz}$$

In the equation for numerical formula 2 given above, "i" represents the density of current carried by proton in z, $C_m$ represents the methanol concentration in z, and $\gamma C_m(z)$ represents the number of methanol molecules hydrated with a single proton. The value of $\gamma$ used was 25 cm$^3$/mol, i.e., $\gamma$=25 cm$^3$/mol, as disclosed in literature "J. Electrochem Soc., 147, No. 2, 466 (2000)". Also, the value of $4.9 \times 10^{-6}$ exp {2436 (1/333–1/T)} was used as the methanol diffusion coefficient within the Nafion® membrane, and the value of 0.5 was used as the Nafion content $\epsilon$ of the electrode on the assumption of the catalyst layer comprising as a carrier carbon black. Further, F represents the Faraday constant, which is 96485 C/mol. Still further, the conduction of oxygen was described by the Nernst-Planck equation accompanying the convection term as shown by numerical formula (3) given below:

Numeral Formula (3):

$$-D_{O_2}\frac{d^2 C_{O_2}}{dz^2} - \frac{d}{dz}\left(C_{O_2}(z)\frac{k_\phi}{\mu} C_f F \frac{d\phi_{H^+}}{dz}\right) = \frac{1}{4F}\frac{di}{dz}$$

where $k_\phi$ was $7.18 \times 10^{-16}$ cm$^2$, the water viscosity $\mu$ was $3.56 \times 10^{-4}$ kg/m/sec, the concentration $C_f$ of the stationary charge within the Nafion® membrane was $1.2 \times 10^{-3}$ mol/cm$^3$, and the diffusion coefficient (cm$^2$/sec)$D_{o2}$ of the oxygen dissolved in the Nafion® membrane was $3.1 \times 10^{-3}$ exp (–2768/T).

Figure 3:
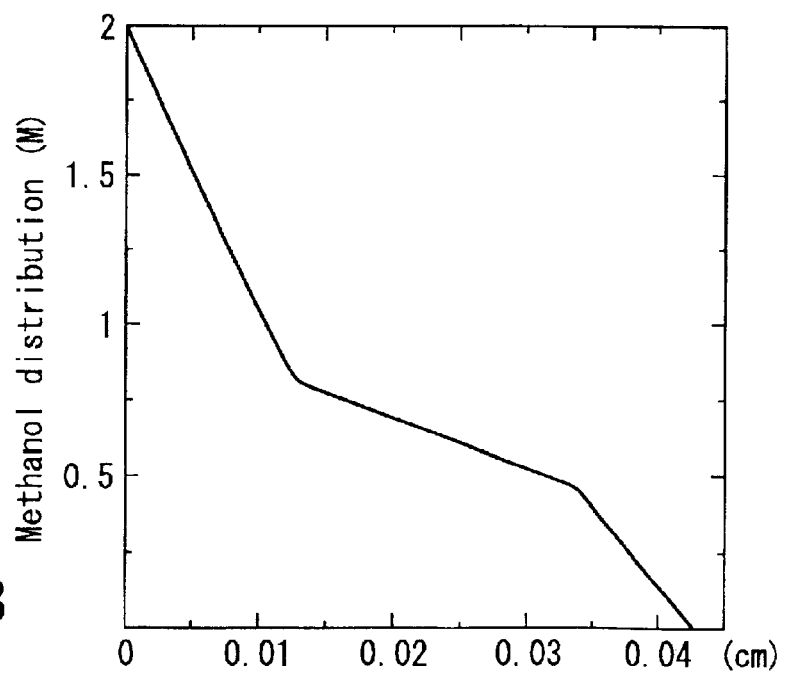
FIG. 3 is a graph showing the spatial methanol distribution in the electromotive section included in a direct methanol fuel cell.

It is possible to calculate the methanol concentration and the space dependency of the oxygen concentration in the electromotive section of the direct methanol fuel cell by the equations of numerical formulas 1 to 3 given above without consideration of self-contradiction. Also, the concentration and the flowing speed of the methanol aqueous solution supplied from the methanol aqueous solution container to the electromotive section can be represented as the boundary condition of the equation for the methanol conduction. FIG. 3 is a graph showing the space dependency of the methanol concentration obtained by an experiment using a direct methanol fuel cell of the construction shown in FIG. 1. In this experiment, the thickness of the anode catalyst layer 2 was set at 100 μm, the electrolyte membrane 5 was formed of a Nafion 117 (trade name of Dupont, U.S.A.) having a thickness of 200 μm, the thickness of the cathode catalyst layer 4 was set at 100 μm, and a methanol aqueous solution having a concentration of 2M was supplied at a flow rate of 1.3 mL/min. In the graph of FIG. 3, the moving distance (cm) of the methanol aqueous solution is plotted on the abscissa, and the concentration M of the methanol aqueous solution at the moved point is plotted on the ordinate.

Figure 4:
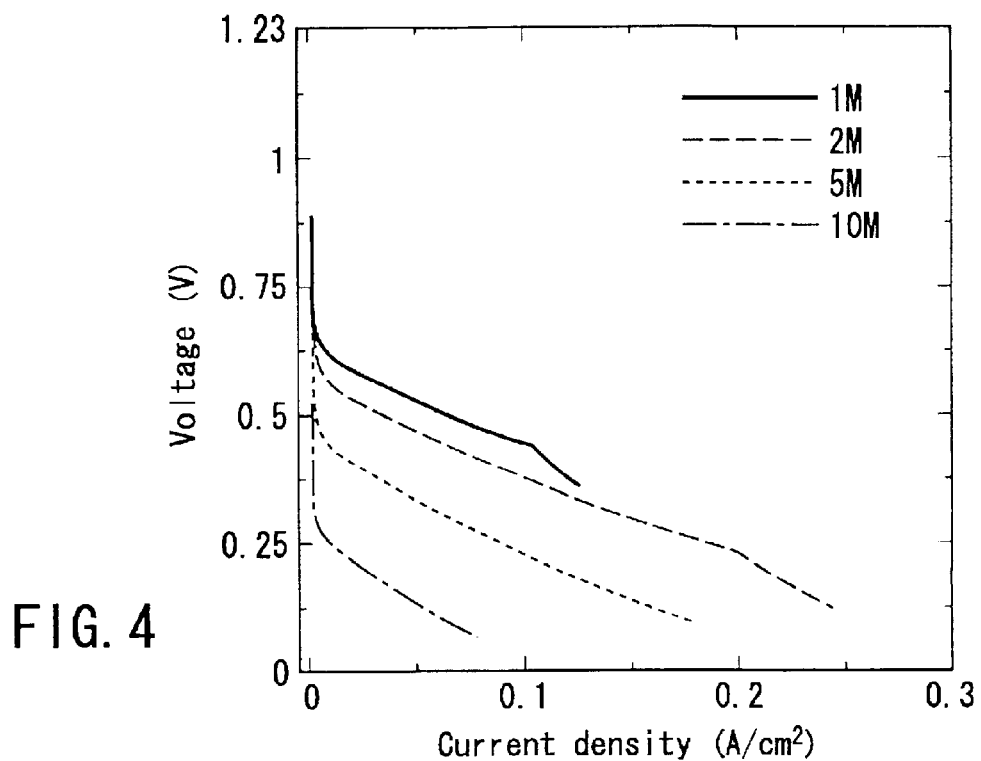
FIG. 4 is a graph showing the experimental data on the current-voltage characteristics of a direct methanol fuel cell, the experiments being performed by changing the methanol concentration in a methanol aqueous solution container to 1M, 2M, 5M and 10M.

As apparent from FIG. 3, the methanol aqueous solution permeated into the cathode catalyst layer has an average concentration of about 0.25M. A cross-over overvoltage is generated in the cathode catalyst layer by the permeating methanol. However, since the formula accurately setting forth the relationship between the methanol concentration and the cross-over overvoltage has not been clarified, it was impossible to discuss accurately the output characteristics of the direct methanol fuel cell. Such being the situation, the change in the current-voltage characteristics was measured for the case where the concentration of the methanol aqueous solution supplied to the anode catalyst layer was changed in order to derive the conditions (1) to (3) referred to previously. Based on the experimental data, a formula giving the relationship between the cross-over overvoltage and the concentration of methanol impregnated in the cathode catalyst layer was derived. FIG. 4 is a graph showing the experimental data. In the graph of FIG. 4, the current density (A/cm$^2$) of the fuel cell is plotted on the abscissa, and the unit cell voltage (V) is plotted on the ordinate.

As apparent from FIG. 4, the cross-over overvoltage is increased with increase in the concentration of methanol supplied to the anode catalyst layer, leading to a prominent voltage drop. The particular phenomenon will now be theoretically analyzed. Specifically, methanol entering the cathode catalyst layer permits effectively diminishing the Pt surface area that is to be reacted with protons. Further, methanol carries out a four-electron reaction with oxygen on Pt so as to generate a proton. As a result, current is locally generated so as to bring about a back electromotive force. The former effect is represented as follows. The disappearance of a proton from the cathode catalyst is given by numerical formula 4 given below:

Numerical Formula (4):

$$\frac{di}{dz} = ai_0 \sinh\left(\frac{2\zeta}{kT}\right)$$
$$\approx ai_0 \sinh \exp\left(\frac{2\zeta}{kT}\right)$$
$$= a'i_0 \exp\left(\frac{2(\zeta + \zeta_x)}{kT}\right)$$

Therefore, the effective catalyst surface area a' relative to the proton that has been changed upon entry of methanol into the cathode catalyst layer can be represented by numerical formula 5 given below:

Numerical Formula (5):

$$\frac{a}{a'} = \exp\left(\frac{2\zeta_x}{kT}\right)$$

Further, it is known as the Freundlich formula that the value of a/a' is proportional to the average methanol concentration $<C_m>^{1/n}$ in the cathode catalyst layer. It follows that the cross-over overvoltage $\zeta_X$ is considered to have a dependency on the concentration as denoted by numerical formula 6 given below:

Numerical Formula (6):

$$\zeta_x = kT(\beta + \gamma \log <C_m>)$$

Further, since the voltage drop caused by the current of protons generated by the cross-over is considered to be proportional to the reaction rate of the direct reaction between methanol and oxygen, the voltage drop has a dependency on the concentration proportional to the primary order of $<C_m>$. If this term is added to the equation of numerical formula 6 given above, obtained is a formula of cross-over overvoltage represented by numerical formula 7 given below:

Numerical Formula (7):

$$\zeta_x = \alpha <C_m> + kT(\beta + \gamma \log <C_m>)$$

It should be noted that the current density formed by protons flowed locally by the cross-over is given by $\alpha <C_m>/\sigma^C_{H+}/L_C$ and, thus, it is necessary to determine the coefficient α by numerical formula 8 given below when the current density noted above is rendered greater than the methanol flux flowing into the cathode catalyst layer. However, the methanol flux is rendered smaller than the current density in general and, thus, the values of α, β and γ are unknown.

Numerical Formula (8):

$$\alpha = \tilde{J}_m \sigma^c_{H^+} L_c / <C_m>$$

Under the circumstances, these coefficients have been determined by the current-voltage characteristics shown in FIG. 4 so as to obtain the equation represented by numerical formula 9 given below:

Numerical Formula (9):

$$\zeta_x = kT\left(12 + \log <Cm> + \min\left(\frac{J_c \sigma^c_{H^+} L_c}{kT}, 7 <C_m>\right)\right) \quad (7)$$

where $J_c$ is flow rate of the methanol aqueous solution penetrating the cathode electrode. It is possible to calculate systematically the output characteristics of the direct methanol fuel cell based on the formula given above.

Figure 5:
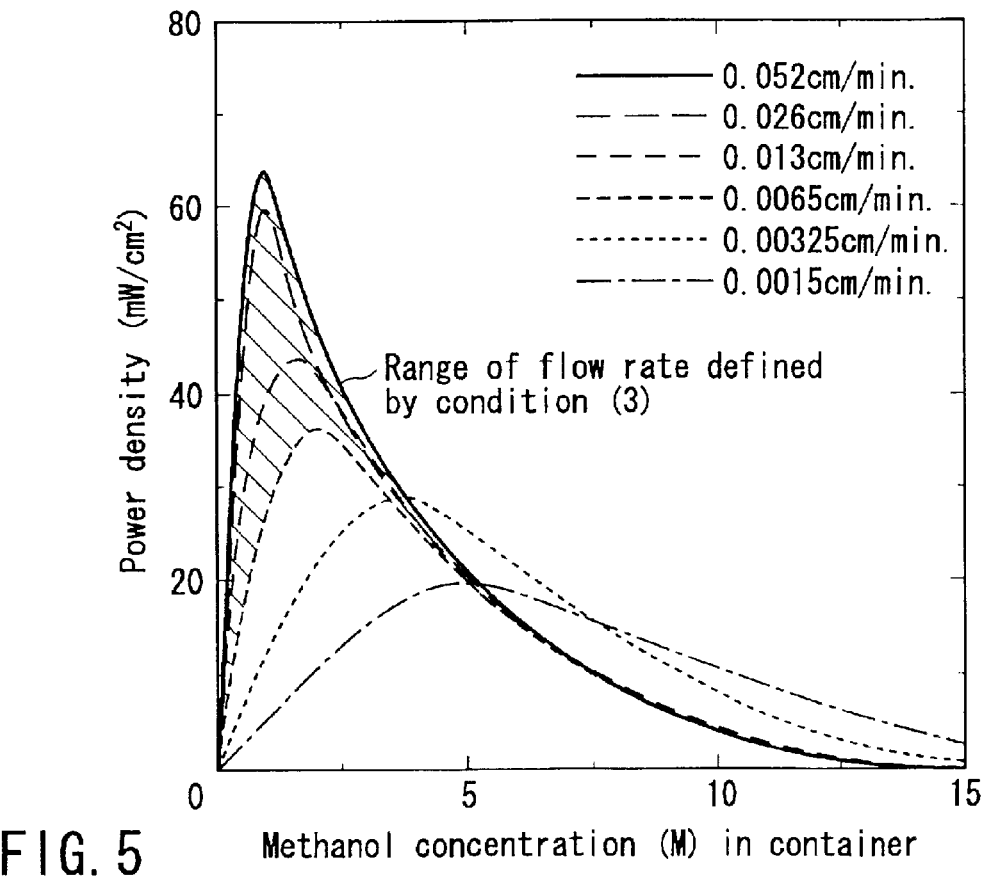
FIG. 5 is a graph showing the dependence of the power density of a direct methanol fuel cell on the methanol concentration in a methanol aqueous solution container and on the flowing speed of the methanol aqueous solution.

FIG. 5 is a graph showing the change in the power density for the case where the concentration and the flowing speed of the supplied methanol aqueous solution were changed in respect of the fuel cell for which the measurement was performed for preparing the graph of FIG. 4. The fuel cell used for preparing the graph of FIG. 4 is constructed as shown in FIG. 1, wherein the number N of electromotive section units stacked one upon the other to form the electromotive section was 1, and the thickness of the anode catalyst layer 2 was 100 μm. In the graph of FIG. 5, the power density, which is defined to represent the maximum value of the product between the current density and the voltage, is plotted on the ordinate. The value obtained by multiplying the power density by the cross sectional area of the fuel cell gives the output of the fuel cell. On the other hand, the methanol aqueous solution supplied from the methanol aqueous solution container is plotted on the abscissa of the graph shown in FIG. 5. Each of the curves in the graph represents the change in the power density, covering the case where the methanol aqueous solutions supplied per unit area of the anode catalyst layer differ from each other in the flowing speed.

As apparent from FIG. 5, the power density has the maximum value relative to the concentration of the methanol aqueous solution, if the flowing speed of the methanol aqueous solution is set constant. It is seen that the concentration of the methanol aqueous solution giving the maximum value of the power density is shifted toward the lower concentration side with increase in the flowing speed. To be more specific, the amount of methanol entering the anode catalyst layer is increased with increase in the concentration of the methanol aqueous solution supplied from the methanol aqueous solution container so as to increase the critical load current and, thus, to increase the output. However, if the amount of methanol supplied to the cathode catalyst layer reaches a certain level, the amount of methanol permeating the cathode catalyst layer is also increased so as to increase the cross-over overvoltage and, thus, to decrease the output by contraries. It follows that the maximum value of the power density curve assumes to change in accordance with the concentration of the supplied methanol aqueous solution. It is also seen that the maximum power density is monotonously increased with increase in the flowing speed of the methanol aqueous solution so as to reach a saturated point in the flowing speed of 0.052 cm/min. It is considered reasonable to interpret that the output is saturated because the maximum flowing speed at which methanol can be diffused within the anode catalyst layer is determined by the thickness of the anode catalyst layer. To be more specific, even if the methanol aqueous solution is supplied at a flowing speed not lower than 0.052 cm/min, the output is not increased. On the contrary, the pump output is increased so as to decrease the output of the fuel cell apparatus including the fuel cell and the pump.

Figure 6:
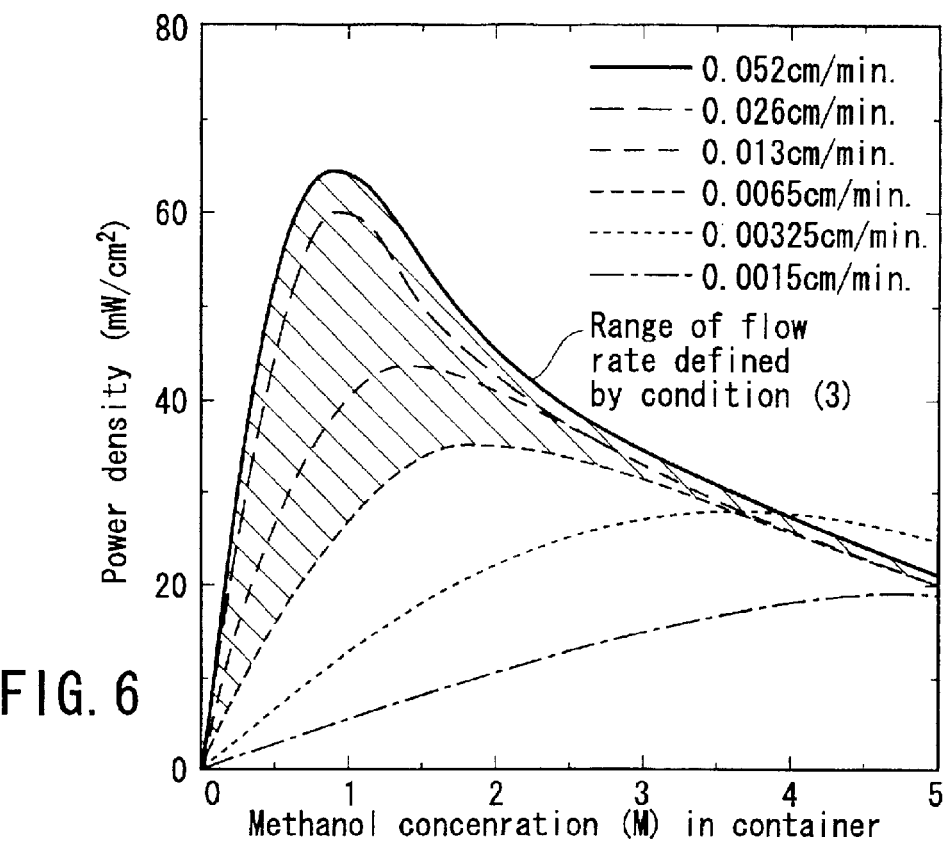
FIG. 6 is a graph showing in a magnified fashion the graph of FIG. 5, covering the range where the methanol concentration is not higher than 5M.

FIG. 6 is a graph showing the change in the power density, covering the case where the concentration of the methanol aqueous solution supplied to the anode catalyst layer is set to fall within a desired range not higher than 5M.

Figure 7:
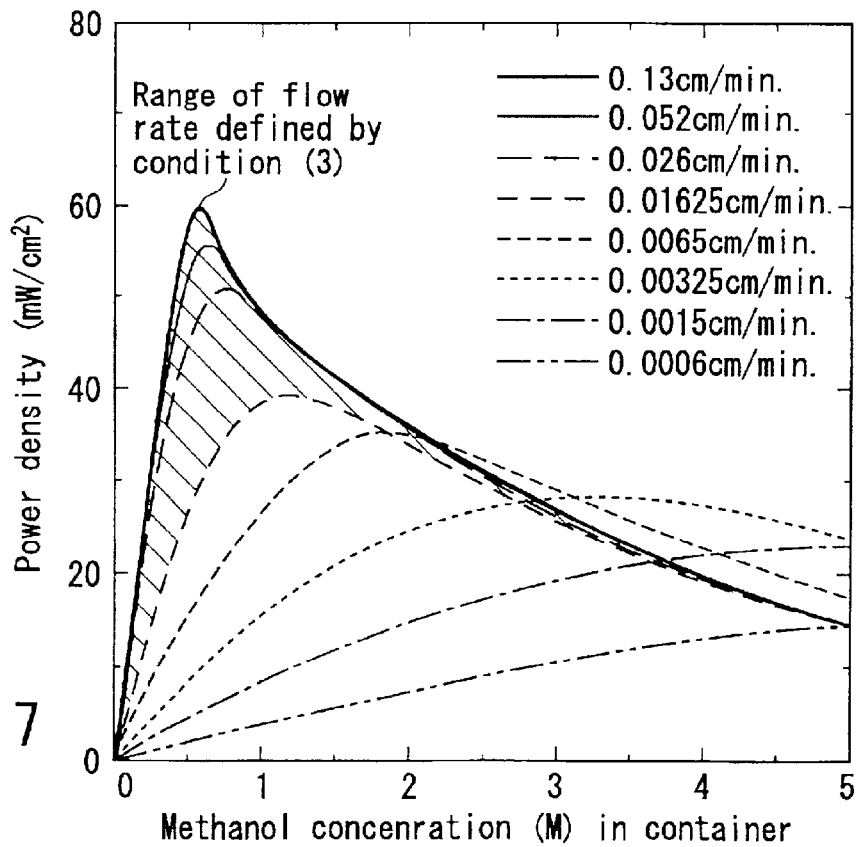
FIG. 7 is a graph showing the change in the power density relative to the methanol concentration in a methanol aqueous solution container and the flowing speed of the methanol aqueous solution, covering the case where the thickness of the anode catalyst layer is set at 40 μm.

As apparent from FIG. 6, a fuel cell apparatus in which the methanol aqueous solution is supplied at a flowing speed not higher than 0.052 cm/min is desirable in terms of the output of the fuel cell apparatus. As described above, the upper limit of the flowing speed (0.052 cm/min) is determined by the flowing speed of methanol when the output is saturated, and the lower limit of the flowing speed (0.0015 cm/min) represents the flowing speed that does not bring about the fuel shortage in supplying the methanol aqueous solution having a concentration of 5M. Also, the optimum flowing speed is changed depending on the thickness of the anode catalyst layer and, thus, the calculation was similarly performed in the case where the thickness of the anode catalyst layer was set at 40 $\mu$m. FIG. 7 is a graph showing the results of the calculation.

As apparent from FIG. 7, if the thickness of the anode catalyst layer is decreased to 40 $\mu$m, the methanol concentration at which the output is rendered maximum is shifted toward the lower concentration side so as to obtain the maximum power density in the case where the methanol concentration is set at 0.5M. In order to avoid the rapid methanol shortage, it is desirable to set the thickness of the anode catalyst layer such that the methanol concentration that permits producing the maximum power density is set at a level not lower than 0.5M. Under the circumstances, it is desirable to set the thickness of the anode catalyst layer at a level not smaller than 40 $\mu$m. Further, as apparent from FIGS. 6 and 7, when the flowing speed (cm/min) of the methanol aqueous solution supplied to the unit area of the anode catalyst layer falls within the range defined by numerical formula 10 given below (N=1, S=1 cm$^2$), the power density remains substantially constant if the methanol concentration of the methanol aqueous solution falls within a range of between 2M and 5M. The range defined by numerical formula 10 (N=1, S=1 cm$^2$) denotes the range shaded in FIG. 6, i.e., the range between 0.0065 cm/min and 0.052 cm/min, and the range shaded in FIG. 7, i.e., the range between 0.01625 cm/min and 0.13 cm/min.

Numerical Formula (10):

$$0.65/L \leq J_m \leq 5.2/L$$

It should be noted that, where the flowing speed of the methanol aqueous solution falls within the range noted above, the cross-over phenomenon taking place within the cathode catalyst layer determines the reaction rate. It is seen that, where the flowing speed (cm/min) is not higher than 0.65/L, i.e., not higher than 0.0065 cm/min in FIG. 6, and not higher than 0.01625 cm/min in FIG. 7, the methanol shortage is brought about within the anode catalyst layer if the methanol concentration of the supplied methanol aqueous solution is lower than 2M, which lowers the power density. However, it is also seen that, where the methanol concentration of the supplied methanol aqueous solution falls within a range of between 2M and 5M, there is a region in which the power density is increased even if the flowing speed of the methanol aqueous solution is lowered. The range of the flowing speed within which the power density is increased is considered to be the region in which the power consumption of the pump is decreased and, at the same time, the power density is increased so as to prominently improve the energy conversion efficiency, which is the optimum range of the flowing speed at which the methanol aqueous solution having the methanol concentration falling within a range of between 2M and 5M is supplied. The range of the flowing speed within which the power density is increased denotes the range in which is obtained the power density higher than that obtained under 5.2/L within the range defined by numerical formula 11 given below (N=1, S=1 cm$^2$). The range defined by numerical formula 11 denotes the range between 0.0015 cm/min and 0.0065 cm/min in FIG. 6, and the range between 0.0375×10$^{-5}$ cm/min and 0.01625 cm/min in FIG. 7.

Numerical Formula (11):

$$1.5 \times 10^{-5} L \leq J_m \leq 0.65/L$$

Figure 8:
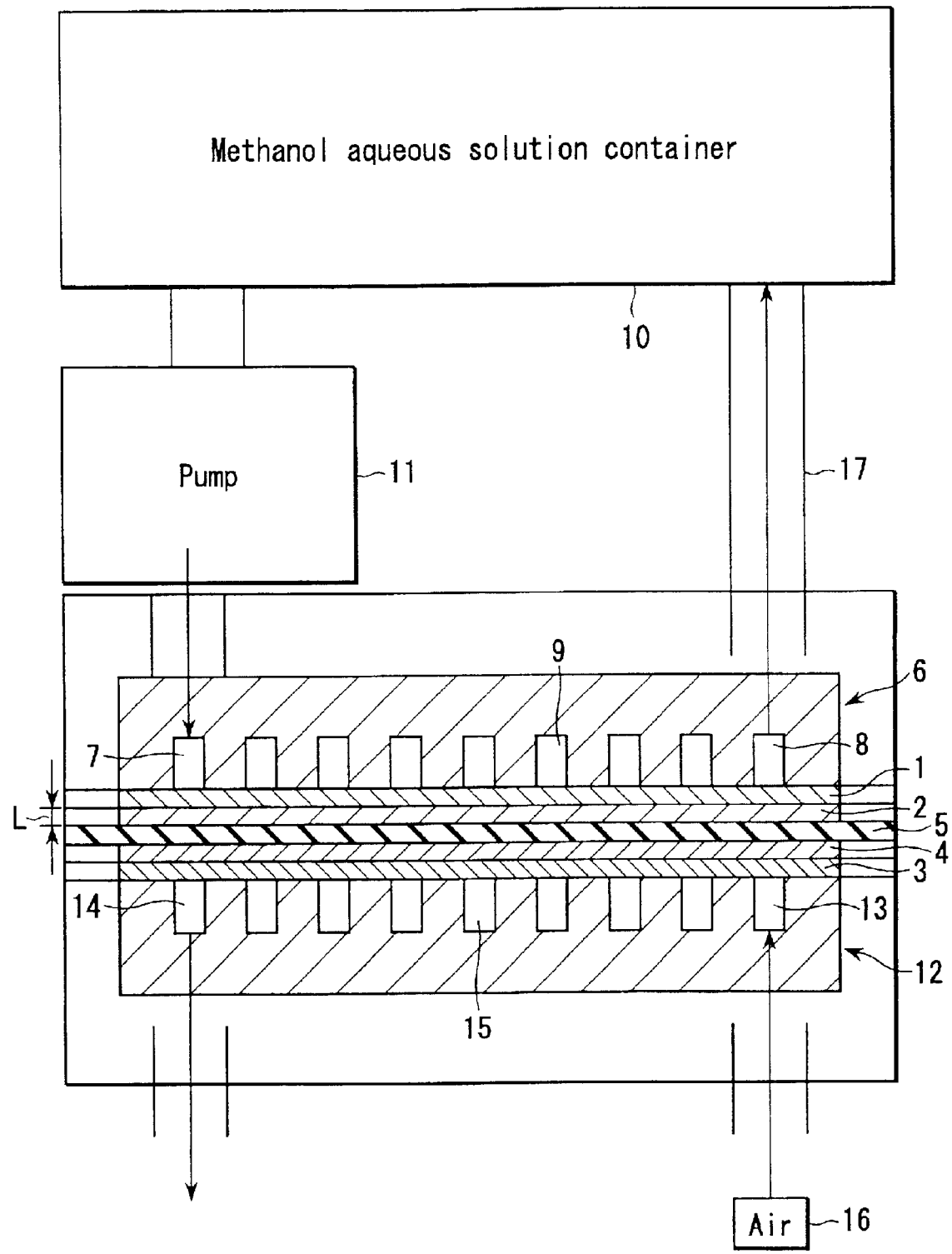
FIG. 8 is a schematic diagram exemplifying the construction of a first direct methanol fuel cell power generating apparatus according to one embodiment of the present invention.

Further, in the fuel cell apparatus of the construction shown in FIG. 1, the methanol aqueous solution discharged from the anode fluid channel plate 6 is recovered through a different route. In the direct methanol fuel cell power generating apparatus according to one embodiment of the present invention, the methanol aqueous solution discharged from the anode fluid channel is recovered in the methanol aqueous solution container. FIG. 8 schematically shows as an example the construction of the gist portion of the direct methanol fuel cell power generating apparatus according to one embodiment of the present invention. The members of the apparatus shown in FIG. 8, which correspond to the members of the apparatus shown in FIG. 1, are denoted by the same reference numerals so as to omit the description thereof. The apparatus shown in FIG. 8 comprises a methanol aqueous solution recovery pipe 17 used as the methanol aqueous solution recovery mechanism. As shown in FIG. 8, the pipe 17 is connected between the methanol outlet 8 of the anode fluid channel 9 and the methanol aqueous solution container 10.

According to the direct methanol fuel cell power generating apparatus constructed as shown in FIG. 8, the methanol aqueous solution discharged from the anode fluid channel 9 is recovered in the methanol aqueous solution container 10 so as to make it possible to diminish the volume of the methanol aqueous solution container 10. However, since the concentration of the methanol aqueous solution within the container 10 is gradually lowered, the methanol shortage tends to be generated in the electromotive section so as to bring about a rapid decrease of the output. It should be noted in this connection that it is possible to restore the power density even if the concentration of the methanol aqueous solution is lowered, if the flowing speed of the supplied methanol aqueous solution is changed in accordance with the concentration of the methanol aqueous solution within the methanol aqueous solution container, as discussed above. The range of the methanol flowing speed $J_m$ is given by conditions (2) and (3) given below:

$$L \geq 40 \qquad (2)$$

$$N \cdot 0.65/L \cdot S \leq J_m \leq N \cdot 5.2/L \cdot S \qquad (3)$$

where, L denotes the thickness ($\mu$m) of the anode catalyst layer included in the direct methanol fuel cell, S denotes the reaction area (cm$^2$) of the anode catalyst layer, N denotes the number of electromotive section units stacked one upon the other to form the electromotive section, and $J_m$ denotes the flowing rate (mL/min) at which the methanol aqueous solution is supplied from the container. When the direct methanol fuel cell power generating apparatus comprises at least two pumps connected to the container, the flowing rate $J_m$ (mL/min) is a total amount of the methanol aqueous solution that the at least two pumps supply per minute. Also, when the direct methanol fuel cell power generating apparatus comprises a pump connected to the container, the flowing rate $J_m$ (mL/min) is an amount of the methanol aqueous solution that the pump supplies per minute.

It should also be noted that it is possible to suppress the output of the auxiliary apparatus at the minimum level and to make minimum the volume of the methanol aqueous solution container, if the initial concentration $C^0_m$ (M) of the methanol aqueous solution in the methanol aqueous solution container 10 is set to fall within the range defined by condition (1) given below, and if the flowing speed $J_m$ of the methanol aqueous solution is increased within the range defined in condition (3) given above in accordance with decrease in the concentration of the methanol aqueous solution within the methanol aqueous solution container:

$$2 \leq C_m^0 \leq 5 \tag{1}$$

The initial concentration $C^0_m$ (M) is a concentration of a methanol aqueous solution put first in the methanol aqueous solution container 10. Incidentally, it is desirable to prepare the anode catalyst layer by the supporting method in which the catalyst is supported by a conductive carbon black carrier. In the case of using the anode catalyst layer prepared by the supporting method, it is possible to improve the diffusion rate of the methanol aqueous solution so as to further improve the output of the fuel cell and drive the fuel cell for a long time. In addition, it is possible to suppress the manufacturing cost of the fuel cell power generating apparatus.

It is desirable for the thickness of the anode catalyst layer L to fall within a range of between 40 μm and 150 μm.

It is desirable for the porosity of the anode catalyst layer (the Nafion content ε) to fall within a range of between 0.4 and 0.7. Where the porosity falls within the range noted above, it is possible to obtain a high diffusion rate of the methanol aqueous solution.

Also, if the anode catalyst layer having a thickness not larger than 20 μm is prepared by a non-supporting method, if the concentration of the methanol aqueous solution is set at a level not higher than 1M, and if the flowing speed of the supplied methanol aqueous solution is set higher than the upper limit defined by condition (3) given previously, i.e., set higher than {(5.2/L)×S} (mL/min), it is certainly possible to increase the power density, as apparent from FIGS. 6 and 7. However, since the output of the auxiliary apparatus is increased, the power density obtained from a prescribed amount of methanol is lowered. In addition, since the concentration of the methanol aqueous solution is low, it is unavoidable to increase the volume of the methanol aqueous solution container. Such being the situation, it is possible to increase the power density while achieving the miniaturization of the methanol aqueous solution container and reduction in the output of the auxiliary apparatus by housing a methanol aqueous solution of a high concentration in the methanol aqueous solution container, by increasing the thickness of the anode catalyst layer, and by lowering the supply rate of the methanol aqueous solution in view of the concentration of the methanol aqueous solution within the container as in the present invention.

The present invention also provides a direct methanol fuel cell power generating apparatus, comprising an electromotive section comprising at least one of an electromotive section unit and a laminate structure prepared by stacking a plurality of the electromotive section units one upon the other, the electromotive section unit including an anode electrode comprising an anode catalyst layer having a thickness not smaller than 40 μm, a cathode electrode and an electrolyte membrane interposed between the anode electrode and the cathode electrode; and a container containing a methanol aqueous solution having a concentration falling within a range of between 2M and 5M, wherein the flowing rate $J_m$ (mL/min) at which the methanol aqueous solution is supplied from the container falls within a range defined by condition (4) given below:

$$N \cdot 1.5 \times 10^{-5} \cdot L \cdot S \leq J_m \leq N \cdot 0.65 / L \cdot S \tag{4}$$

where L denotes the thickness (μm) of the anode catalyst layer, S denotes the reaction area (cm²) of the anode catalyst layer, and N denotes the number of electromotive section units that are stacked one upon the other to form the electromotive section. When the direct methanol fuel cell power generating apparatus comprises at least two pumps connected to the container, the flowing rate $J_m$ (mL/min) is a total amount of the methanol aqueous solution that the at least two pumps supply per minute. Also, when the direct methanol fuel cell power generating apparatus comprises a pump connected to the container, the flowing rate $J_m$ (mL/min) is an amount of the methanol aqueous solution that the pump supplies per minute.

According to the fuel cell power generating apparatus of the present invention constructed as described above, it is possible to increase the ratio of the methanol aqueous solution actually permeating the anode catalyst layer to the prescribed amount of the methanol aqueous solution supplied from the anode fluid channel to the anode catalyst layer. It follows that it is possible to obtain a high fuel utilization factor, even if the excess methanol aqueous solution is not recovered in the container. Also, the flow rate $J_m$ of the methanol aqueous solution is low and, at the same time, it is possible to obtain the highest power density that can be obtained under the flow rate $J_m$ specified in the present invention so as to improve the energy conversion efficiency of the fuel cell. It follows that the present invention provides a direct methanol fuel cell power generating apparatus excellent in both the fuel utilization factor and the energy conversion efficiency.

Some Embodiments of the present invention will now be described with reference to the accompanying drawings.

A first direct methanol fuel cell power generating apparatus according to one embodiment of the present invention will now be described first with reference to FIGS. 8 to 12.

Figure 9:
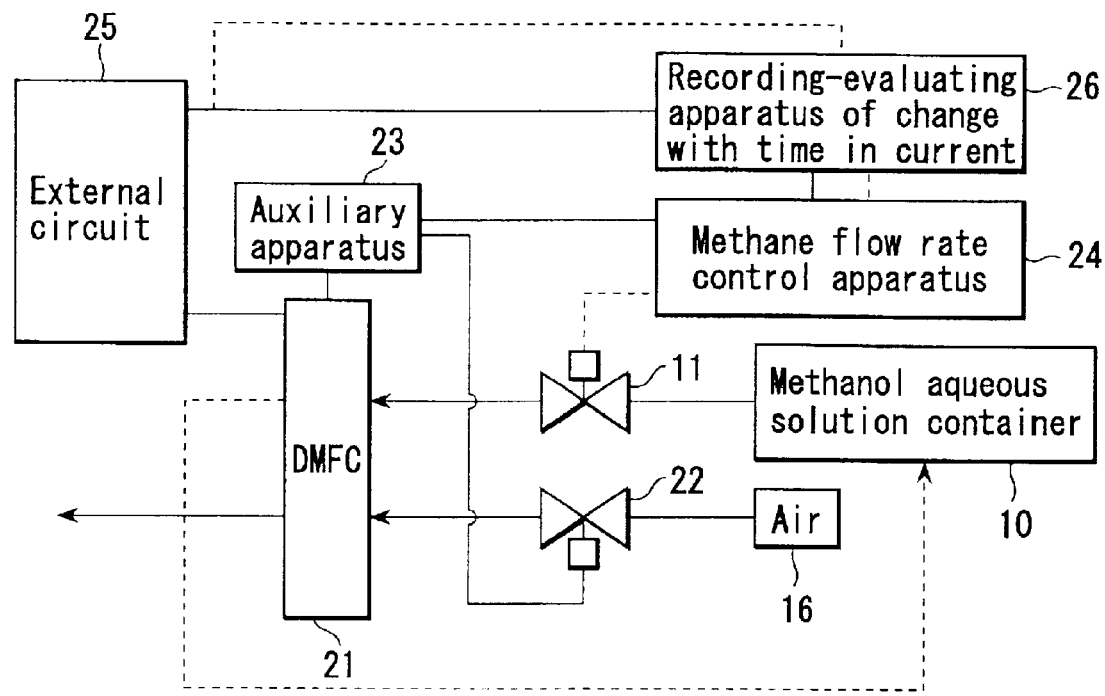
FIG. 9 is a circuit diagram exemplifying the construction of a first direct methanol fuel cell power generating apparatus according to one embodiment of the present invention.
Figure 10:
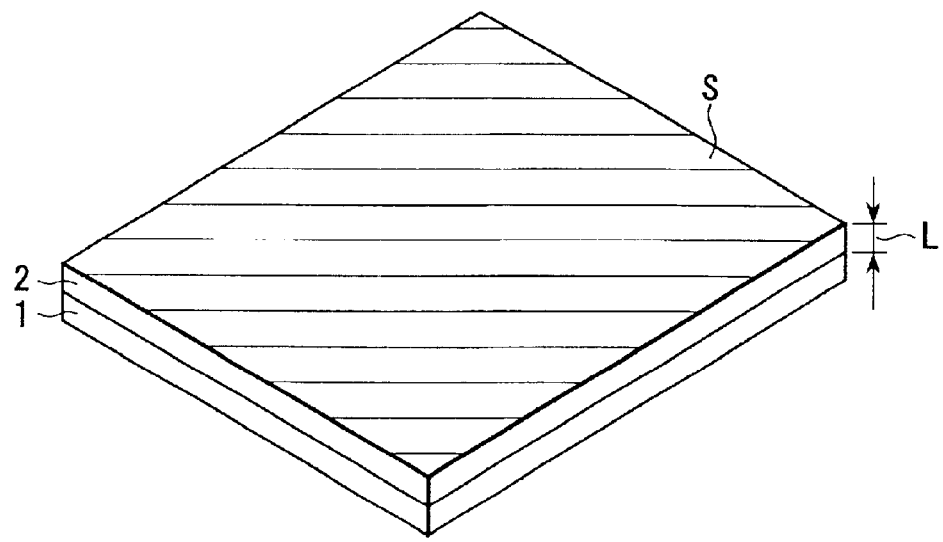
FIG. 10 is an oblique view showing one embodiment of the anode electrode included in the direct methanol fuel cell power generating apparatus shown in FIG. 8.
Figure 11:
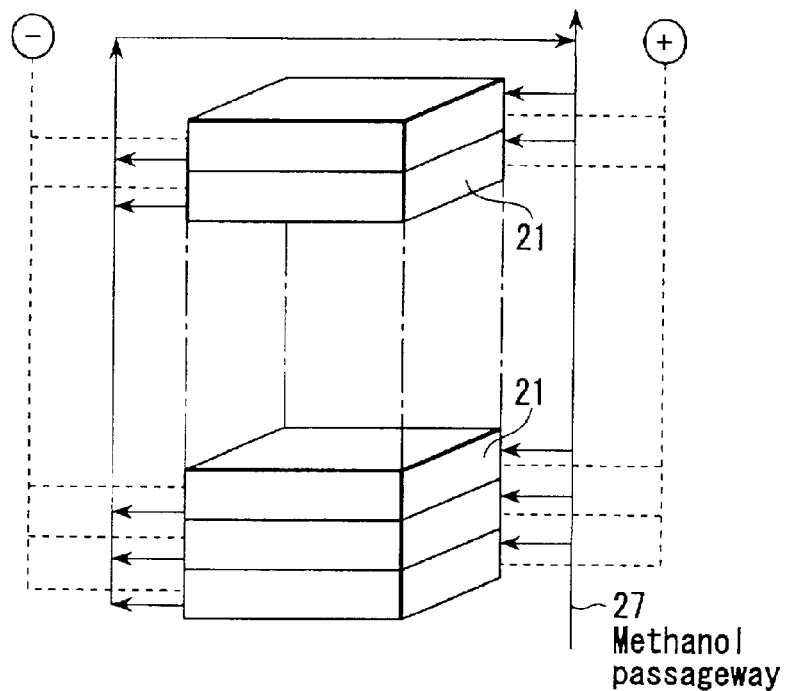
FIG. 11 a drawing exemplifying the method of supplying a methanol aqueous solution in the case where a plurality of electromotive section units of the direct methanol fuel cell power generating apparatus shown in FIG. 8 are stacked one upon the other so as to be connected in series.
Figure 12:
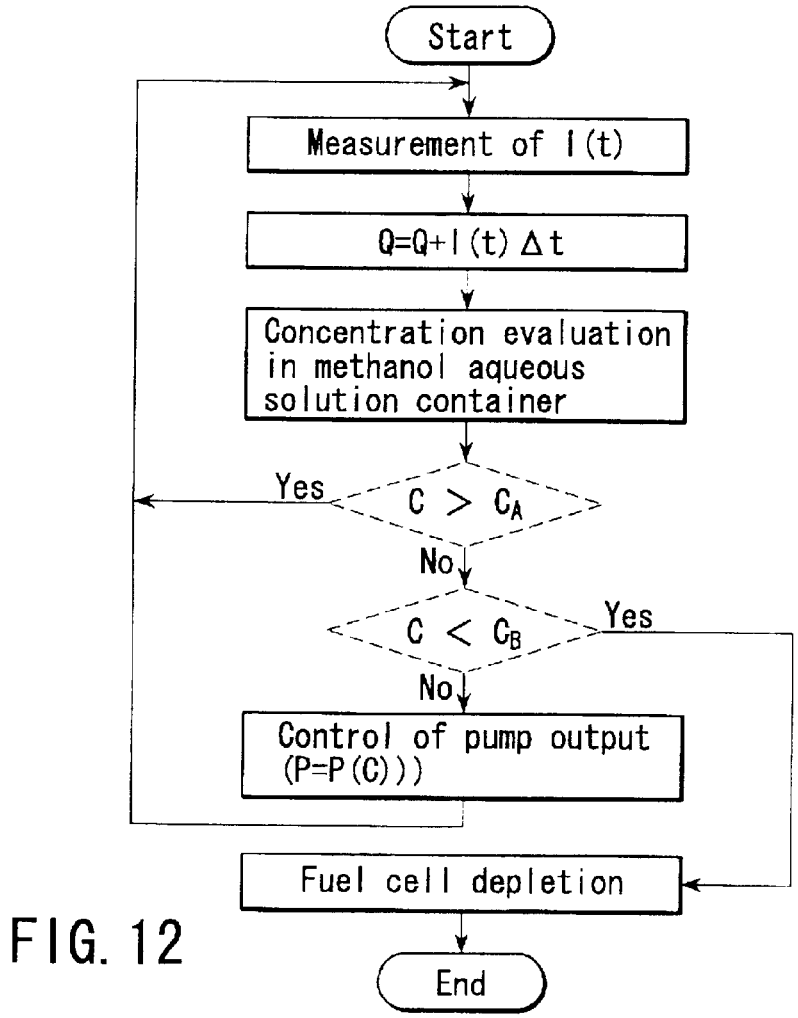
FIG. 12 is a flow chart of a first direct methanol fuel cell power generating apparatus according to one embodiment of the present invention.

FIG. 9 schematically shows the construction of the first direct methanol fuel cell power generating apparatus according to one embodiment of the present invention. FIG. 10 is an oblique view showing one embodiment of the anode electrode included in the direct methanol fuel cell power generating apparatus shown in FIG. 9. FIG. 11 schematically shows an example of the state that electromotive section units of the direct methanol fuel cells are stacked one upon the other so as to be connected in series. FIG. 12 is a flow chart showing as an example the procedure for operating the first direct methanol fuel cell power generating apparatus according to one embodiment of the present invention.

The fuel cell electromotive section is formed of a single fuel cell electromotive section unit 21. As shown in, for example, FIG. 8 referred to previously, the fuel cell electromotive section unite 21 comprises the anode fluid channel plate 6, the anode current collector 1, the anode catalyst layer 2, the electrolyte membrane 5, the cathode catalyst layer 4, the cathode current collector 3 and the cathode fluid channel plate 12. The methanol aqueous solution container 10 housing a methanol aqueous solution is connected to the methanol inlet 7 of the anode fluid channel plate 6 via the solution supply pump 11. Also, the methanol outlet 8 of the anode fluid channel plate 6 is connected to the methanol aqueous solution container 10. The oxidizing agent supply mechanism 16 configured to supply an oxidizing agent such as the air is connected to the oxidizing agent inlet 13 of the cathode fluid channel plate 12 via an air blowing fan 22. Further, a heater (not shown) which heats the fuel cell electromotive section is mounted to each of the anode fluid channel plate 6 and the cathode fluid channel plate 13. Since the auxiliary apparatus including the solution supply pump 11, the air blowing fan 22 and the heater noted above is driven by the output of the direct methanol fuel cell, a power source 23 of the auxiliary apparatus is connected directly to the direct methanol fuel cell.

The flow rate controller which controls the flow rate $J_m$ (mL/min) at which the methanol aqueous solution is supplied from the container 10, in accordance with the concentration of the methanol aqueous solution within the container 10. The concentration of the methanol aqueous solution is evaluated from the record of change with operating time in the load current. The flow rate controller includes a methanol flow rate control device 24 and a recording-evaluating device 26. The recording-evaluating device 26 records the change with time in the current and evaluates the concentration of the methanol aqueous solution within the container 10 by the obtained records. The methanol flow rate control device 24 is connected to the solution supply pump 11. An external circuit 25 is connected to the fuel cell electromotive section. Further, the recording-evaluating device 26 is connected to both the methanol flow rate control device 24 and the external circuit 25.

According to the flow rate controller of this construction, it is possible to record the change with time in the current generated from the direct methanol fuel cell 21 to the external circuit 25 in the recording-evaluating device 26. It is also possible for the methanol flow rate control device 24 to control the solution supply amount of the solution supply pump 11 per unit time in accordance with the concentration of the methanol aqueous solution within the container 10, the concentration being evaluated from the data recorded in the recording-evaluating device 26. In other words, the solution supply amount of the pump 11 per unit time is regarded as the flow rate $J_m$ (mL/min) at which the methanol aqueous solution is supplied from the container. When the direct methanol fuel cell power generating apparatus comprises at least two pumps connected to the container 10, the flow rate $J_m$ (mL/min) is a total amount of the methanol aqueous solution that the at least two pumps supply per minute.

In the power generating apparatus shown in FIG. 9, conditions (1) to (3) given below are satisfied:

$$2 \leq C_m^0 \leq 5 \quad (1)$$

$$L \geq 40 \quad (2)$$

$$N \cdot 0.65/L \cdot S \leq J_m \leq N \cdot 5.2/L \cdot S \quad (3)$$

where $C_m^0$ denotes the initial concentration (M) of the methanol aqueous solution in the methanol aqueous solution container 10, L denotes the thickness (μm) of the anode catalyst layer 2, and S denotes the reaction area (cm$^2$) of the anode catalyst layer 2, which is equal to the area shaded in FIG. 10. Also, N denotes the number of electromotive section (power generating section) units 21 that are stacked one upon the other to form the electromotive section. The initial concentration $C_m^0$ (M) is a concentration (M) of a methanol aqueous solution housed first in the methanol aqueous solution container 10. Where the electromotive section is formed of a single electromotive section unite 21 as shown in FIG. 9, the flow rate of the methanol aqueous solution flowing through the anode fluid channel 9 is substantially equal to the flow rate $J_m$ (mL/min) at which the methanol aqueous solution is supplied from the container 10.

It is possible for the power generating apparatus shown in FIG. 9 to be provided with a plurality of fuel cell electromotive section units. FIG. 11 exemplifies the case where a plurality of fuel cell electromotive section units 21 are stacked one upon the other in series. In this case, the methanol aqueous solution is supplied to each of the fuel cell electromotive section units 21 as denoted by arrows 27 showing the methanol fluid passageways. Also, the methanol aqueous solution streams discharged from the individual fuel cell electromotive section units 21 are combined to form a single route so as to be recovered in the methanol aqueous solution container 10 (parallel solution supply method). In this case, the flow rate of the methanol aqueous solution supplied into the anode fluid channel of each electromotive section unite 21 is substantially equal to the flow rate $J_m$ (mL/min) of the methanol aqueous solution, which is divided by the number of electromotive section units.

On the other hand, it is possible to supply methanol to the stacked electromotive section units through a single methanol fluid channel, which is not branched, by stacking another fuel cell electromotive section unit on the fuel cell electromotive section unit 21 shown in FIG. 1 so as to connect the methanol outlet 8 of the anode fluid channel plate 6 included in the fuel cell electromotive section 21 to the methanol inlet 7 of the anode fluid channel plate 6 of the other fuel cell electromotive section unit (series solution supply method). In this case, the flow rate of the methanol aqueous solution flowing through the anode fluid channel 9 is substantially equal to the flow rate $J_m$ (mL/min) at which the methanol aqueous solution is supplied from the container 10.

It is also possible to arrange a plurality of solution supply pumps such that these pumps serve to supply the methanol aqueous solution in series to some electromotive sections and such that these supplying fluid channels are bumbled in parallel. The flow rate $J_m$ (mL/min) at which the methanol aqueous solution is supplied from the container is a total amount of the methanol aqueous solution that the pumps supply per minute.

Incidentally, the electromotive force of a direct methanol fuel cell comprising a single electromotive section unit is not larger than 0.6V. Therefore, in order to charge a nonaqueous electrolyte secondary battery such as a lithium ion secondary battery having the maximum electromotive force of 4.2V, it is necessary to connect in series at least 10 electromotive section units.

The first direct methanol fuel cell power generating apparatus according to one embodiment of the present invention has a high industrial value because the apparatus can be utilized as a charger of a portable electronic apparatus and can be used for charging various electronic appliances.

The mechanism evaluating the concentration of the methanol aqueous solution housed in the methanol aqueous solution container based on the change with time in the load current obtained from the direct methanol fuel cell will now be described. Briefly speaking, if the current flowing out to the external circuit at time t is set at $I_{(t)}$, the concentration $C_m(t)$ of the methanol aqueous solution housed in the methanol aqueous solution container is represented by numerical formula 12 given below:

Numerical Formula (12):

$$C_m(t) = \left(C_m^0 V - \frac{1}{6F}\int_0^t dt' I(t')\right) / \left(\left(C_m^0 V - \frac{1}{6F}\int_0^t dt' I(t')\right)V_m + \left(\frac{1-C_m^0 V_m}{V_w}V - \frac{1}{6F}\int_0^t dt' I(t')\right)V_w\right)$$

Numerical formula 12 given above is based on a consumption ratio of methanol molecules and water molecules of 1:1 in the reaction performed in the anode catalyst layer. In numerical formula 12, $C^0_m$ denotes the initial concentration (M) of the methanol aqueous solution housed first in the container, $V_m$ denotes the molar volume of methanol, $V_w$ denotes the molar volume of water, and V denotes the volume of the container. The initial concentration $C^0_m$ (M) is a concentration of a methanol aqueous solution housed first in the container.

Where it is desired to know the methanol concentration more accurately, it is possible to measure the amount of electricity flowing to the external circuit and the methanol concentration of the methanol aqueous solution so as to determine experimentally the relationship between the amount of the electricity noted above and the methanol concentration noted above. If the particular relationship thus determined is stored in the apparatus, it is possible to control accurately the flow rate of the supplied methanol aqueous solution by recording and evaluating the change with time in the current flowing from within the apparatus. Further, if the relationship between the amount of the electricity flowing to the external circuit and the methanol concentration within the container is stored inside the apparatus, it is possible to know when the methanol aqueous solution housed in the container should be renewed. In other words, it is possible to know the sign indicating the battery depletion like the secondary battery available on the market, which is advantageous in the industry.

Various methods are conceivable for detecting the concentration of the methanol aqueous solution housed in the methanol aqueous solution container. For example, it is conceivable to connect as an auxiliary apparatus an apparatus for detecting the concentration of the methanol aqueous solution such as a methanol sensor to the circuit within the fuel cell apparatus. However, it is not advisable to employ this method because a methanol sensor has not yet been developed and because this method is costly. It is also conceivable to measure the methanol concentration within the methanol aqueous solution container by utilizing the phenomenon that the electrical resistance is changed by the difference in the concentration of the methanol aqueous solution. However, it is not advisable to employ this method because the circuit is rendered complex, and a large power consumption is involved in this method. It is also conceivable to detect the position of the liquid surface within the methanol aqueous solution container so as to evaluate the methanol concentration within the methanol aqueous solution container. In this case, however, the measurement is considered to be rendered difficult with decrease in the volume of the methanol aqueous solution container. Under the circumstances, employed in the direct methanol fuel cell power generating apparatus according one embodiment of the present invention is the mechanism evaluating the concentration of the methanol aqueous solution contained in the methanol aqueous solution container based on the total amount of the electricity obtained from the apparatus.

The method of operating the first direct methanol fuel cell power generating apparatus according to one embodiment of the present invention will now be described as an example with reference to the flow chart shown in FIG. 12.

At the starting time, the parameter Q in the flow chart is set at 0. The loop is executed at the interval of time Δt. In the recording-evaluating apparatus 26, the change with time in the current $I_{(t)}$ flowing from the direct methanol fuel cell 21 to the external circuit 25 is measured and, then, the process represented by $Q=Q+I_{(t)}\Delta t$ is carried out. To be more specific, the current is integrated with time for obtaining the amount Q of the electricity, followed by evaluating the methanol concentration C in the methanol aqueous solution container 10 by using the result Q of the calculation. The evaluation of the methanol concentration C using the result Q of the calculation can be carried out by using, for example, the numerical formula 12 referred to previously. As shown in FIGS. 6 and 7 referred to previously, where the concentration of the methanol aqueous solution within the methanol aqueous solution container 10 is lower than 2M, a higher power density can be obtained if the flow rate at which the methanol aqueous solution is supplied is rendered higher. "$C_A$" in the flow chart is set at 2M of the methanol concentration. If the methanol concentration within the methanol aqueous solution container 10 is equal to or higher than $C_A$, the power generation is continued without changing the output of the solution supply pump 11. In other words, the first power generation step is carried out. By contraries, where the methanol concentration C within the methanol aqueous solution container 10 is rendered lower than $C_A$, the power generation is continued while increasing continuously or intermittently the output of the solution supply pump 11 such that the flow rate $J_m$ satisfies the range defined by condition (3) referred to previously. In other words, the second power generation step is carried out. However, where the methanol concentration C within the methanol aqueous solution container 10 is rendered lower than $C_B$, the fuel cell is depleted and, thus, an instruction is given to renew the methanol aqueous solution container 10. Incidentally, if the methanol concentration C within the methanol aqueous solution container 10 is rendered lower than 0.5M, it is difficult to obtain a high power density even if the flow rate $J_m$ is increased, as apparent from FIGS. 6 and 7 referred to previously. It follows that it is desirable to set the methanol concentration $C_B$ at 0.5M.

Incidentally, where the power generation performed by the direct methanol fuel cell power generating apparatus is interrupted, it is desirable to store the value of the parameter Q at the interrupted time. It is possible to calculate more accurately the methanol concentration C within the methanol aqueous solution container 10 by setting the parameter Q at the interrupted time as the initial value when the power generation is restarted.

The second direct methanol fuel cell power generating apparatus according to one embodiment of the present invention will now be described with reference to FIGS. 13 to 15.

Figure 13:
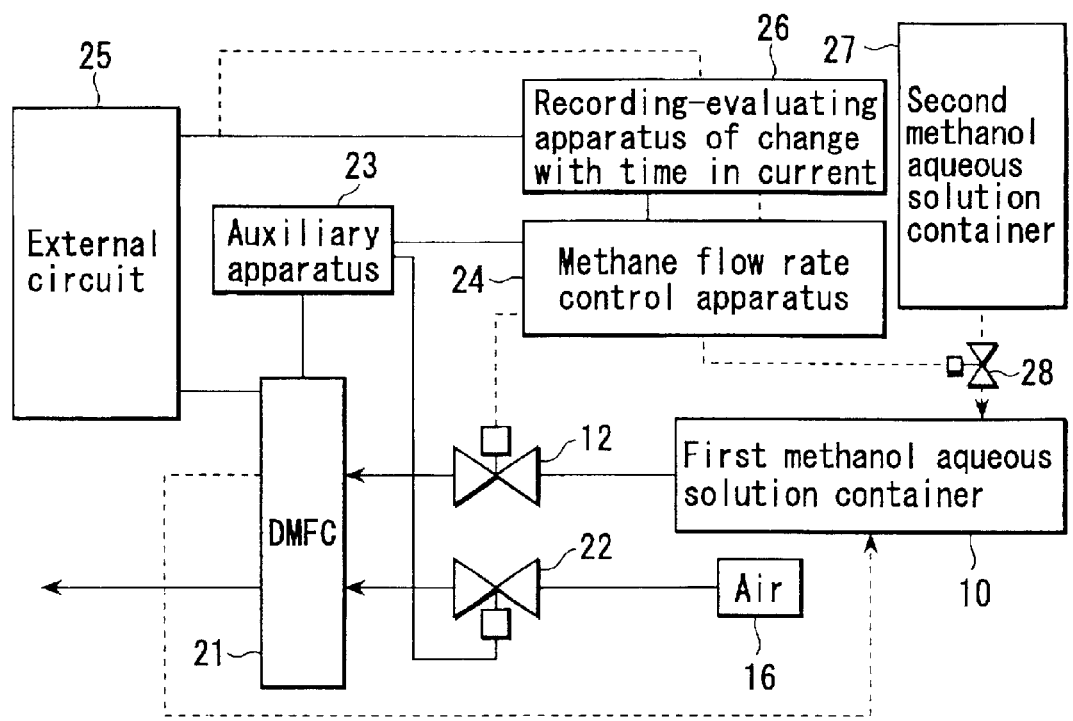
FIG. 13 is a circuit diagram exemplifying the construction of a second direct methanol fuel cell power generating apparatus according to one embodiment of the present invention.
Figure 14:
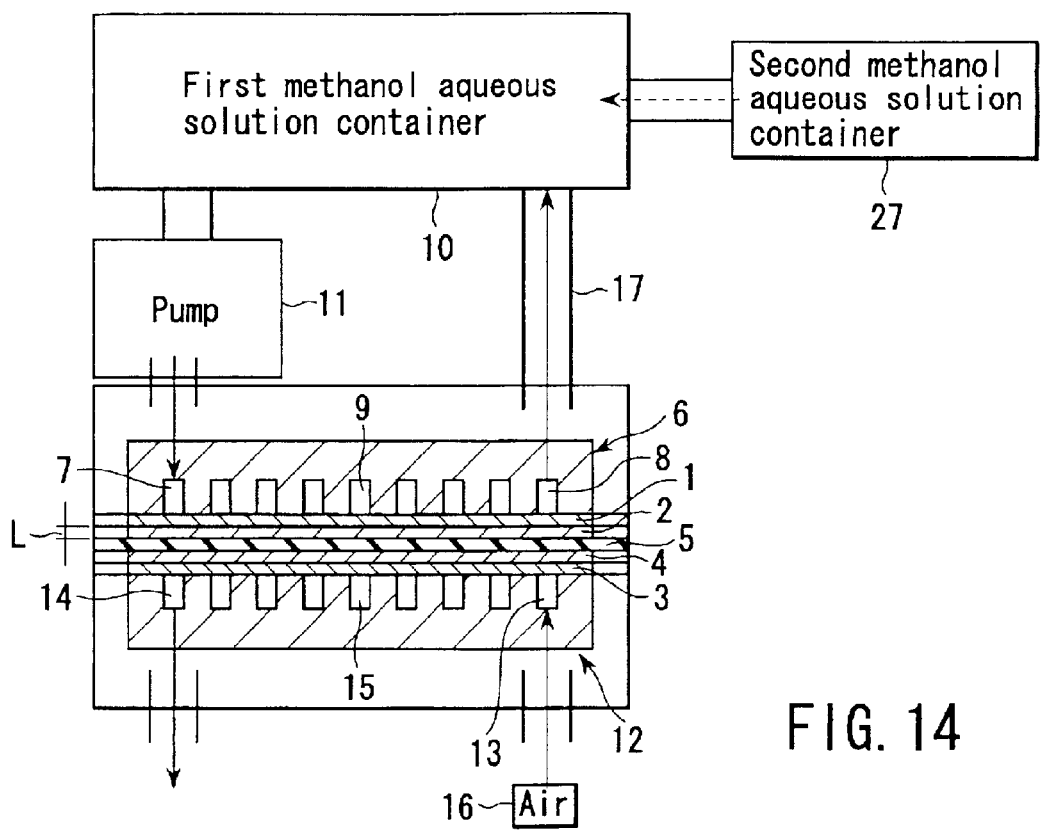
FIG. 14 is a drawing schematically showing the gist portion of the direct methanol fuel cell power generating apparatus shown in FIG. 13.
Figure 15:
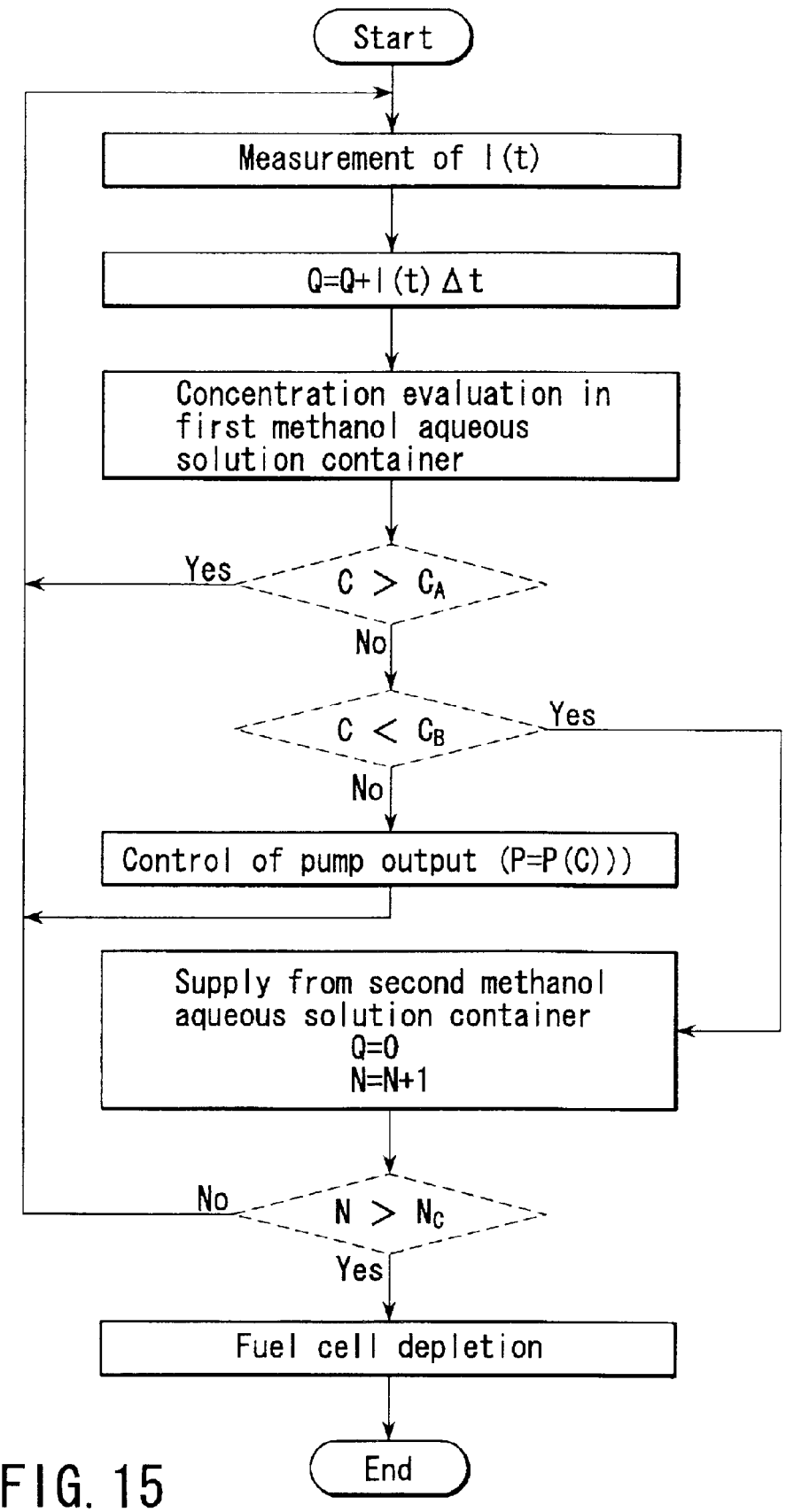
FIG. 15 is a flow chart showing the direct methanol fuel cell power generating apparatus according to one embodiment of the present invention.

FIG. 13 schematically shows the construction of the second direct methanol fuel cell power generating apparatus according to one embodiment of the present invention, FIG. 14 schematically shows the electromotive section of the second direct methanol fuel cell power generating apparatus shown in FIG. 13, and FIG. 15 is a flow chart exemplifying the procedure for operating the second direct methanol fuel cell power generating apparatus according to one embodiment of the present invention. The members of the apparatus shown in FIGS. 13 and 14, which correspond to the members of the apparatus shown in FIGS. 8 and 9, are denoted by the same reference numerals so as to avoid the overlapping description.

The second direct methanol fuel cell power generating apparatus further comprises a methanol replenishing mechanism configured to replenish a methanol aqueous solution to the methanol aqueous solution container 10 in accordance with the concentration of the methanol aqueous solution housed in the methanol aqueous solution container (first methanol aqueous solution container) 10, said concentration being evaluated from the change with time in the load current. The methanol replenish mechanism noted above includes a second methanol aqueous solution container 27 and a second solution supply pump 28. The methanol flow rate control apparatus 24 and the recording-evaluating apparatus 26 are commonly used in the flow controller and the methanol replenishing mechanism. The second methanol aqueous solution container 27 is connected to the first methanol aqueous solution container 10 via the second solution supply pump 28. The second container 27 should preferably contain a methanol aqueous solution of a higher concentration than the initial concentration $C^0_m$ (M). On the other hand, the second solution supply pump 28 is connected to the methanol flow rate control apparatus 24.

According to the methanol replenishing mechanism of the particular construction, the change with time in the load current generated from the direct methanol fuel cell 21 to the external circuit 25 is recorded in the recording-evaluating apparatus 26, and the methanol concentration in the first methanol aqueous solution container 10 is evaluated on the basis of the recorded change with time in the load current. The methanol flow rate control apparatus 24 supplies an instruction to the second solution supply pump in accordance with the evaluated methanol concentration so as to permit the methanol aqueous solution to be supplied from the second methanol aqueous solution container 27 to the first methanol aqueous solution container 10.

As shown in FIGS. 6 and 7 referred to previously, the output is rapidly decreased, if the concentration of the methanol aqueous solution in the first methanol aqueous solution container 10 is rendered lower than 0.5M. Therefore, where the concentration of the methanol aqueous solution in the first methanol aqueous solution container 10 is rendered lower than 0.5M, it is necessary to renew the methanol aqueous solution container with the methanol aqueous solution left therein. Such being the situation, thick methanol aqueous solution is supplied from the second methanol aqueous solution container 27 into the first methanol aqueous solution container 10 so as to increase the methanol concentration in the first methanol aqueous solution container 10 not lower than 0.5M in the present invention. It follows that it is possible to continue the second power generation process by reusing the methanol aqueous solution in the first methanol aqueous solution container 10, thereby using completely the methanol aqueous solution in the first methanol aqueous solution container 10. It should also be noted that the second methanol aqueous solution container 27 is exclusively for the replenishing purpose and, thus, it is possible to renew the second methanol aqueous solution container 27 at the time when the methanol aqueous solution in the second methanol aqueous solution container 27 has been completely used. What should also be noted is that it is possible to bring the methanol concentration in the first methanol aqueous solution container 10 back to the initial state by replenishing the methanol aqueous solution from the second methanol aqueous solution container 27 to the first methanol aqueous solution container 10 so as to restore the output and, thus, to carry out the first power generation process again.

As described above, according to the second direct methanol fuel cell power generating apparatus of the present invention, the time to replace the methanol aqueous solution container can be judged easily. In addition, an industrial advantage can also be produced that the used methanol aqueous solution container can be conveniently recovered. Also, as apparent from the discussion given above, a methanol aqueous solution having a high methanol concentration is housed in the second methanol aqueous solution container so as to make it possible to diminish the volume of the second methanol aqueous solution container, compared with the volume of the first methanol aqueous solution container. It follows that it is possible to suppress the volume of the fuel container to the minimum level in the direct methanol fuel cell. Also, the methanol aqueous solution is not supplied from the second methanol aqueous solution container 27 until the methanol concentration in the first methanol aqueous solution container 10 is rendered lower than 0.5M, with the result that it is possible to avoid the marked reduction of the total output of the fuel cell power generating apparatus caused by the output of the solution supply pump 28 so as to make it possible to perform the driving over a long period of time.

An example of the method of operating the second direct methanol fuel cell power generating apparatus will now be described with reference to FIG. 15.

In the starting time, the parameters of both Q and N are set at 0. The steps ranging between the measuring process of $I_{(t)}$ and the process of comparing the methanol concentration C with $C_B$ are carried out as described previously with reference to FIG. 12. When the methanol concentration C within the first methanol aqueous solution container 10, which is evaluated from the amount Q of the electricity, is rendered lower than $C_B$, a signal is supplied from the methanol flow rate control apparatus 24 to the solution supply pump 28 so as to operate the solution supply pump 28, with the result that the methanol aqueous solution is supplied from the second methanol aqueous solution container 27 to the first methanol aqueous solution container 10. It is desirable to keep constant the supply amount of the methanol aqueous solution and to supply the methanol aqueous solution to the first methanol aqueous solution container 10 in an amount required for bringing the methanol concentration in the first methanol aqueous solution container 10 back to the initial state. As a result, it is possible to maintain a high power output.

After the methanol aqueous solution is supplied from the second methanol aqueous solution container 27 into the first methanol aqueous solution container 10, the methanol concentration in the first methanol aqueous solution container 10 is brought back to the initial state and, thus, it is necessary to reset the parameter Q at 0. These processes are repeated, and it is judged that the fuel cell has been depleted at the time when the number of times $N_c$ of the solution supply operations has exceeded the number of times N of the solution supply operations at which methanol aqueous solution in the second methanol aqueous solution container 27 is completely used. As a result, an instruction is generated to renew the second methanol aqueous solution container 27.

Incidentally, where the power generation of the direct methanol fuel cell power generating apparatus is interrupted, it is desirable to store the values of the parameters Q and N at the interrupted time. It is possible to calculate more accurately the methanol concentration C in the methanol aqueous solution container 10 by setting the parameters Q and N at the interrupted time as the initial values when the power generation is started again.

Figure 16:
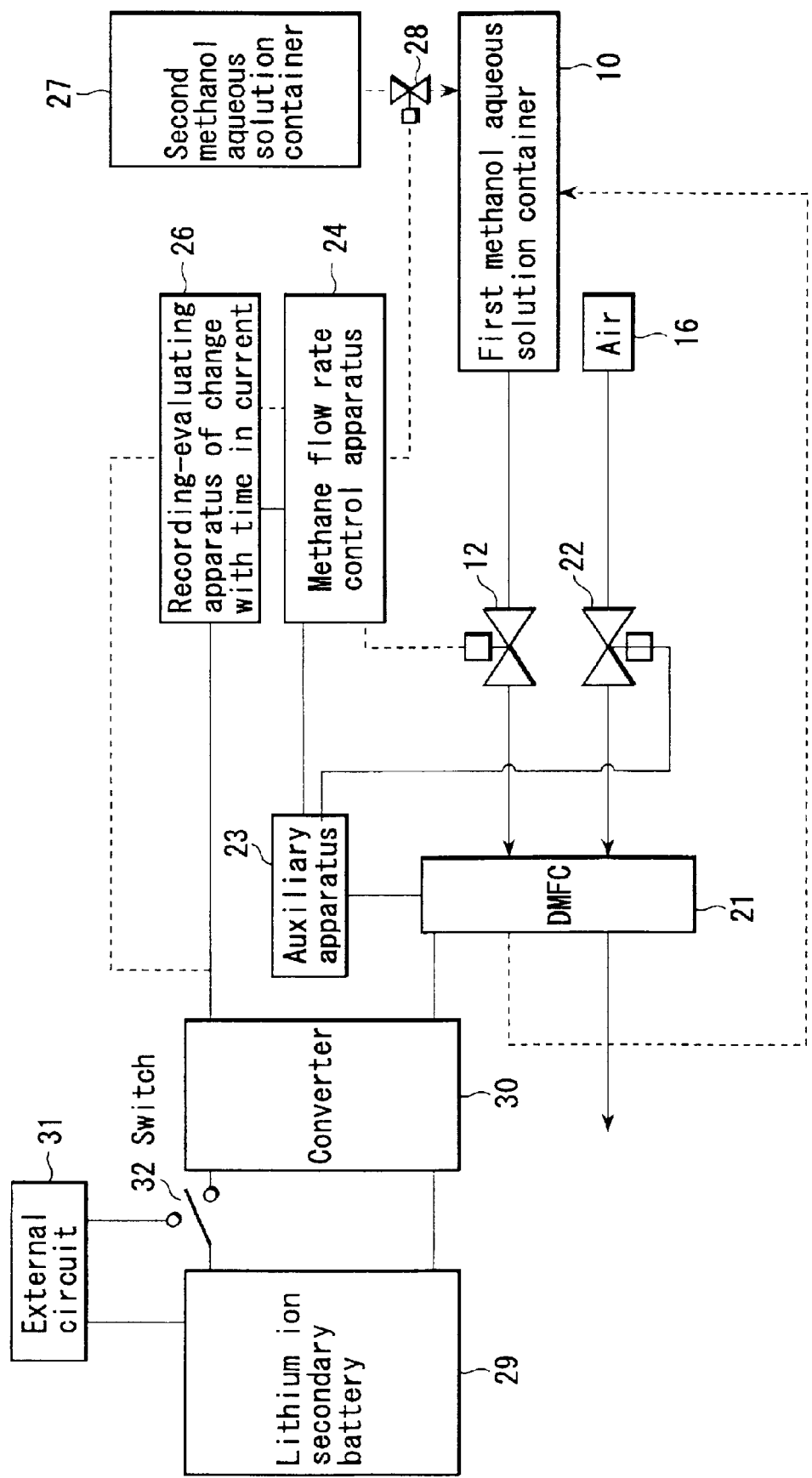
FIG. 16 is a circuit diagram exemplifying the construction of a combined battery according to one embodiment of the present invention.

An example of the combined battery of the present invention will now be described with reference to FIG. 16. Specifically, FIG. 16 schematically shows as an example the construction of the combined battery of the present invention. Those members of the apparatus shown in FIG. 16 which correspond to the members of the apparatus shown in FIGS. 9 and 13 are denoted by the same reference numerals so as to avoid an overlapping description.

The combined battery of the present invention comprises in combination a direct methanol fuel cell and a nonaqueous electrolyte secondary battery such as a lithium ion secondary battery. The portion of the direct methanol fuel cell is substantially equal in construction to the second direct methanol fuel cell power generating apparatus described above, except that at least 10 electromotive section units are stacked one upon the other so as to form the electromotive section in the combined battery. The direct methanol fuel cell and the lithium ion secondary battery 29 are connected in parallel. Also, a converter 30 is interposed between the direct methanol fuel cell and the lithium ion secondary battery 29 so as to permit the voltage of the direct methanol fuel cell to be maintained at 4.2V. Also, an external equipment (external circuit) 31 utilizing the secondary battery 29 as the driving power source is connected to the lithium ion secondary battery 29. When the lithium ion secondary battery 29 is discharged so as to drive the external equipment 31, a switch 32 interposed between the converter 30 and the lithium ion secondary battery 29 is left open. However, when the external equipment 31 is not driven, the switch 32 is kept closed so as to charge the lithium ion secondary battery 29. It takes a long time for the lithium ion secondary battery to be charged. Where the lithium ion secondary battery is used in an electric automobile, about 12 hours of the charging time is expected to be required. Also, there is a defect that it is impossible to charge the lithium ion secondary battery in the site where an external power source is not available. It follows that the combined battery of the present invention is advantageous in that the lithium ion secondary battery can be kept charged when the lithium ion secondary battery is not discharged by connecting the direct methanol fuel cell to the lithium ion secondary battery so as to shorten the charging time. In addition, since the charging can be performed by simply replenishing the methanol aqueous solution, an external power source is not required. Further, the lithium ion secondary battery is disadvantageous in that, if the secondary battery is overcharged, it is impossible to obtain the original capacity even if the secondary battery is charged again. When it comes to the combined battery of the present invention, however, it is possible to charge the secondary battery before the secondary battery is overcharged so as to avoid the reduction of the capacity caused by the overcharging. As described above, a combined battery in which the direct methanol fuel cell is combined with a lithium ion secondary battery is most effective. However, it is theoretically possible to provide a combined battery in which the direct methanol fuel cell of the present invention is combined with a capacitor or with a nickel hydrogen secondary battery.

Embodiment 1

<Preparation of Electromotive Section of Direct Methanol Fuel Cell>

Prepared by the known process disclosed in "R. Ramakumar et. al. J. Power Sources 69 (1997) 75" were a supported catalyst (Pt:Ru=1:1) for the anode in which the catalyst was supported by carbon black and a supported catalyst (Pt) for the cathode in which the catalyst was supported by carbon black. The catalyst for the anode was supported in an amount of 30 parts by weight relative to 100 parts by weight of the carbon black. On the other hand, the catalyst for the cathode was supported in an amount of 15 parts by weight relative to 100 parts by weight of the carbon black.

A Nafion solution SE-20092 (trade name of a perfluoro carbon sulfonic acid solution manufactured by Dupont, U.S.A.) and an ion exchange water were added to the supported catalyst prepared as above, i.e., the carbon black supporting the catalyst for the anode, so as to permit the supported catalyst to be dispersed in the solution and the ion exchange water, thereby preparing a paste. Then, a carbon paper TGPH-120 manufactured by E-TEK Inc., which was used as an anode current collector and to which a water repelling treatment has been applied, was coated with the paste in a thickness of 550 $\mu$m, followed by drying the coated paste so as to form an anode catalyst layer and, thus, to obtain an anode electrode.

On the other hand, a Nafion solution SE-20092 (trade name of a perfluoro carbon sulfonic acid solution manufactured by Dupont, U.S.A.) and an ion exchange water were added to the supported catalyst prepared as above, i.e., the carbon black supporting the catalyst for the cathode, so as to permit the supported catalyst to be dispersed in the solution and the ion exchange water, thereby preparing a paste. Then, a carbon paper TGPH-090 manufactured by E-TEK Inc., which was used as a cathode current collector and to which a water repelling treatment has been applied, was coated with the paste in a thickness of 225 $\mu$m, followed by drying the coated paste so as to form a cathode catalyst layer and, thus, to obtain a cathode electrode.

Then, a Nafion 117 (trade name of a perfluoro carbon sulfonic acid membrane manufactured by Dupont, U.S.A. and available on the market), which was used as an electrolyte membrane, was interposed between the anode catalyst layer of the anode electrode and the cathode catalyst layer of the cathode electrode so as to form a laminate structure, followed by applying a hot pressing treatment to the laminate structure at 125° C. for 5 minutes with a pressing force of 50 kg/cm$^2$ so as to bond the anode electrode, the electrolyte membrane and the cathode electrode, thereby obtain an electromotive section. The cross sectional area S of the anode catalyst layer included in the electromotive section was found to be 10 cm$^2$. Also, the electromotive section was cut and the cross section of the electromotive section was observed with an electron microscope. The thickness L of the anode catalyst layer was found to be 105 $\mu$m, and the thickness of the cathode catalyst layer was found to be 50 $\mu$m. Also, it was confirmed by the electron microscopic observation that the bonded state among the anode electrode, the electrolyte membrane and the cathode electrode had been satisfactory.

<Preparation of Direct Methanol Fuel Cell>

The electromotive section prepared as above was mounted to a separator made of carbon, and was hermetically sealed by the fastening with a screw. A silicone rubber heater was mounted to the separator, and the temperature was controlled by using a temperature controller available on the market such that the temperature inside the holder was kept at 70° C.

Figure 2:
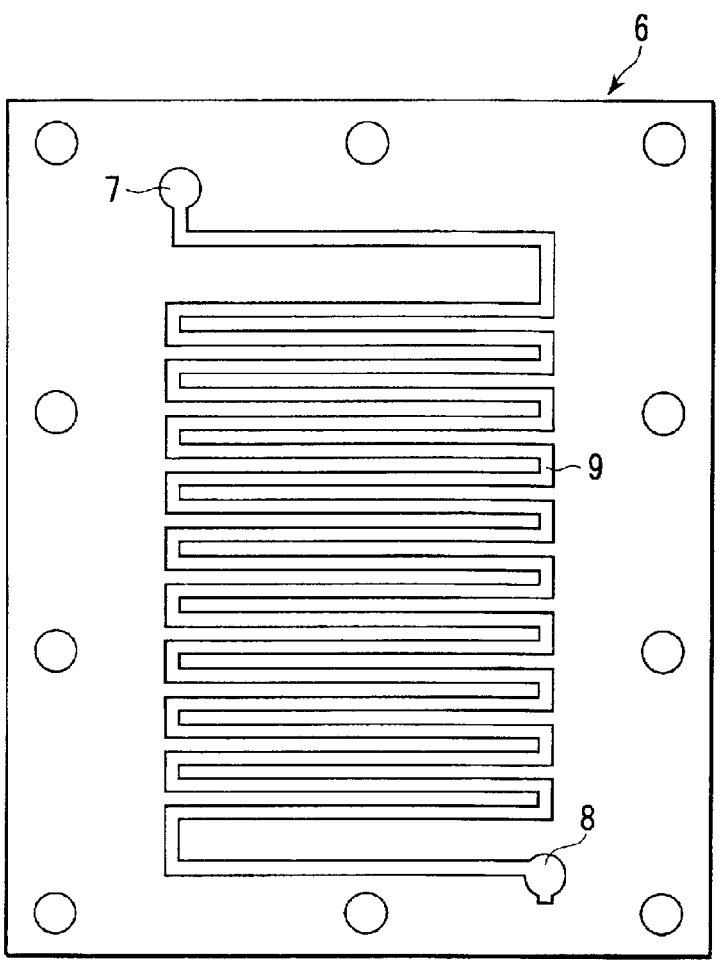
FIG. 2 is a drawing schematically showing the construction of a separator used as a fluid channel plate included in the direct methanol fuel cell shown in FIG. 1.

It should be noted that an anode fluid channel 9 that was shaped as shown in FIG. 2 was formed in the separator positioned on the side of the anode electrode. A supply tube was connected to the methanol inlet 7 of the anode fluid channel 9, and a discharge tube was connected to the methanol outlet 8 of the anode fluid channel 9. A methanol aqueous solution was housed in a methanol aqueous solution container 10 having an inner volume of 10 mL, and the methanol aqueous solution was supplied to the anode fluid channel 9 through the supply tube and the inlet 7 by using a solution supply pump 11 available on the market. The methanol aqueous solution that did not permeate the anode carbon paper used as the anode current collector was discharged through the methanol outlet 8 and through the discharge tube.

On the other hand, a cathode fluid channel 15 shaped like the anode fluid channel was formed in the separator positioned on the side of the cathode electrode. A supply tube was connected to the oxidizing agent inlet 13 of the cathode fluid channel 15, and a discharge tube was connected to the oxidizing agent outlet 14 of the cathode fluid channel 15. Then, the air was supplied by using an air pump available on the market into the cathode fluid channel 15 through the supply tube and through the inlet 13. The flow rate of the air was controlled by using a mass flow controller available on the market.

It was confirmed that the flow rate of the methanol aqueous solution would be controlled within a range of between 0.01 $\mu$L/min and 6 mL/min, and that the flow rate of the air would be controlled within a range of between 20 mL/min and 5 L/min. An electron loading device available on the market was used as a load. Further, a digital multimeter available on the market was used as the voltage detecting mechanism. In this fashion, obtained was a direct methanol fuel cell power generating apparatus constructed as shown in FIGS. 8 and 9 referred to previously.

In the fuel cell power generating apparatus thus obtained, the allowable range of the flow rate $J_m$ (mL/min) defined by condition (3) referred to previously was: $0.062 \leq J_m \leq 0.50$.

<Measurement of Current-Voltage Characteristics>

Figure 17:
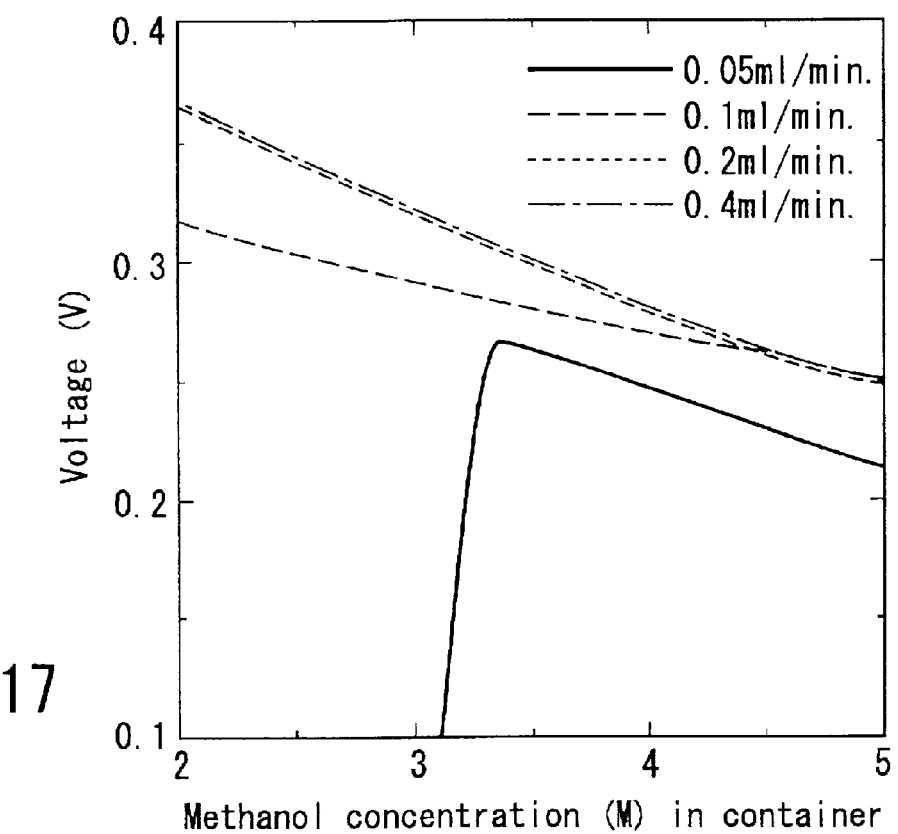
FIG. 17 is a graph showing the results of the measurement in Embodiment 1.

Prepared were methanol aqueous solutions having a methanol concentration $C^0_m$ of 5M, 4M, 3M, 2M, 1M and 0.5M. Each of these methanol aqueous solutions was put in the methanol aqueous solution container 10 and supplied to the anode fluid channel 9 at the flow rate $J_m$ of 0.05 mL/min, 0.1 mL/min, 0.2 mL/min, and 0.4 mL/min so as to measure the voltage value under a constant load current of 1.5 A. FIG. 17 is a graph showing the experimental data. In the graph of FIG. 17, plotted on the abscissa is the initial concentration $C^0_m$ (M) of the methanol aqueous solution within the container 10, and the unit cell voltage (V) is plotted on the ordinate.

Where the methanol aqueous solution was supplied at the flow rate $J_m$ of 0.05 mL/min, the voltage value was rendered 0 when the concentration $C^0_m$ of the methanol aqueous solution was not higher than about 3.2M. However, if the flow rate $J_m$ was increased to 0.2 mL/min, it was possible to measure the voltage even in the case of using a methanol aqueous solution container containing a methanol aqueous solution having the methanol concentration $C^0_m$ not higher than 2.6M, supporting that the voltage was increased under every methanol concentration. Further, when the flow rate $J_m$ was increased to 0.4 mL/min, the unit cell voltage remained substantially unchanged. It has been found that the unit cell voltage is substantially saturated under the flow rate $J_m$ of 0.2 mL/min. It should be noted that the output of the auxiliary apparatus can be diminished, if the flow rate $J_m$ is rendered lower. It follows that the optimum flow rate $J_m$ in this case is 0.2 mL/min.

As described above, it was possible to obtain a sufficiently high voltage of 0.25 to 0.35V by setting the methanol concentration $C^0_m$ of the methanol aqueous solution put first in the methanol aqueous solution container 10 at 2 to 5M, by setting the thickness L of the cathode catalyst layer 2 at 40 $\mu$m or more, and by setting the supply flow rate $J_m$ of the methanol aqueous solution to fall within the range defined by condition (3) referred to previously, i.e., in this case, the low flow rate of 0.2 mL/min. It should also be noted that, since the initial methanol concentration $C^0_m$ was set at a high concentration of 2 to 5M, it was possible to diminish the inner volume of the methanol aqueous solution container 10. Further, since it is possible to set the supply flow rate $J_m$ of the methanol aqueous solution, which permits obtaining a high cell voltage, to fall within the range defined by condition (3) referred to above, e.g., at 0.2 mL/min, it is possible to suppress the output of the auxiliary apparatus and to increase the power density obtained from a prescribed amount of methanol.

Embodiment 2

Figure 18:
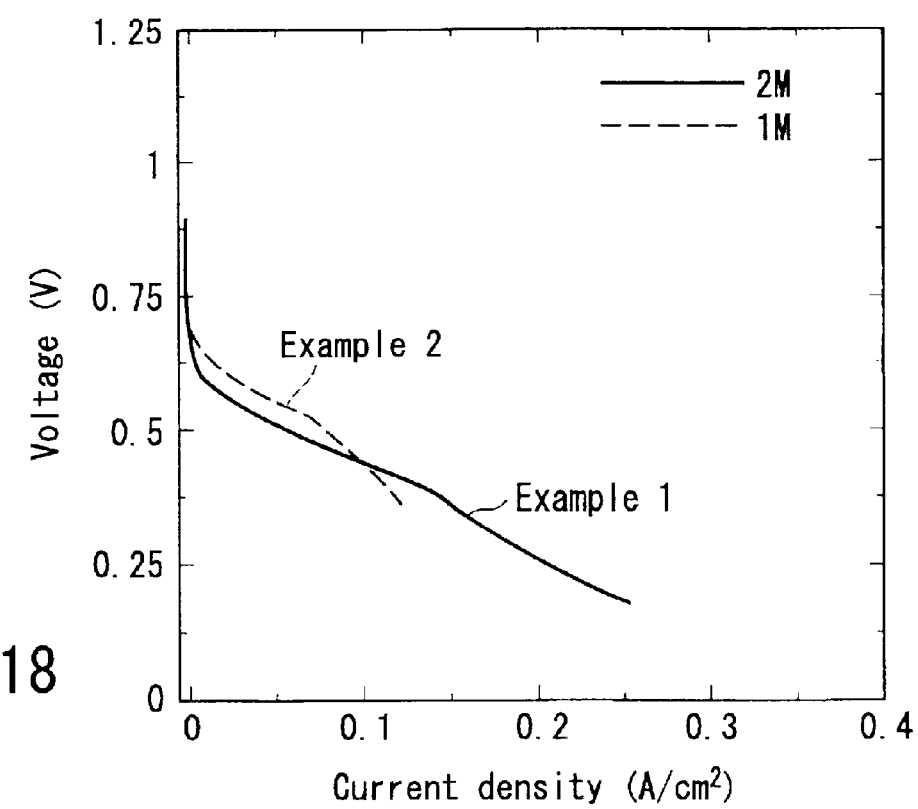
FIG. 18 is a graph showing the results of the measurement in Embodiment 2.

The current-voltage characteristics for Example 1 were measured by supplying a methanol aqueous solution having an initial concentration $C^0_m$ of 2M to the anode catalyst layer at a flow rate $J_m$ of 0.2 mL/min and by supplying air to the cathode catalyst layer at a flow rate of 500 mL/min in the direct methanol fuel cell power generating apparatus of Embodiment 1. Also measured were the current-voltage characteristics for Example 2 by supplying a methanol aqueous solution having an initial concentration $C^0_m$ of 1M to the anode catalyst layer at a flow rate $J_m$ of 0.2 mL/min and by supplying the air to the cathode catalyst layer at a flow rate of 500 mL/min. FIG. 18 is a graph showing the experimental data.

As apparent from FIG. 18, the power density in the fuel cell power generating apparatus for Example 1 satisfying the conditions (1) to (3) referred to previously was 53 mW/cm$^2$, which was markedly higher than 45 mW/cm$^2$ for the fuel cell power generating apparatus for Example 2 in which the initial concentration $C^0_m$ was lower than the lower limit of condition (1) referred to above.

Figure 19:
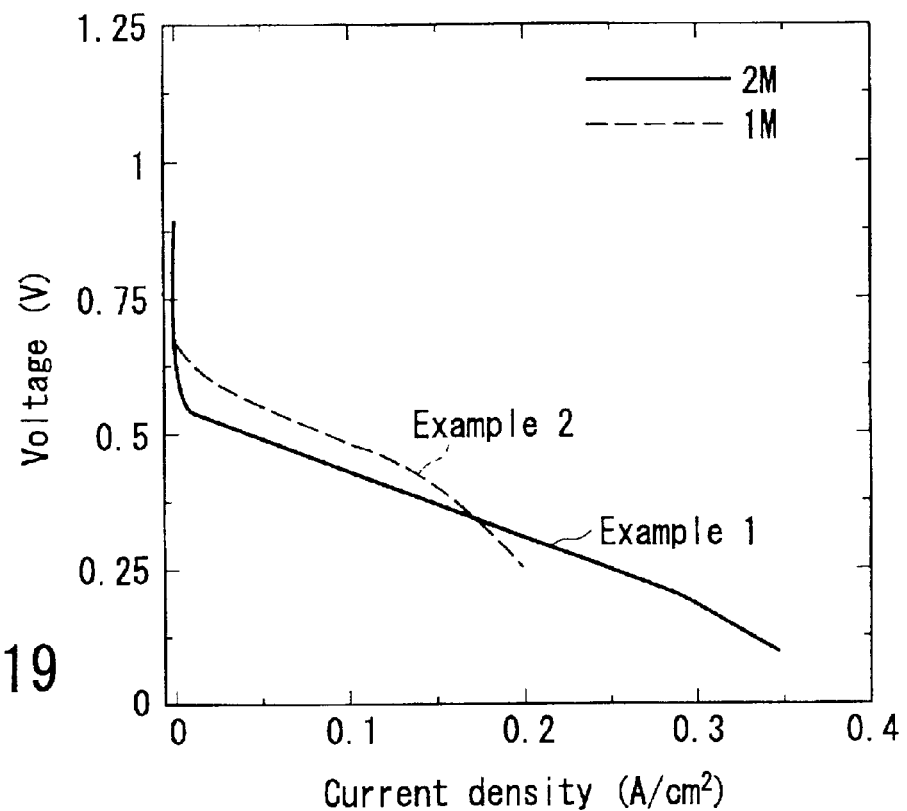
FIG. 19 is a graph showing the results of the other measurement in Embodiment 2.

Further, the flow rate $J_m$ of the methanol aqueous solution was changed to 0.8 mL/min in the fuel cell power generating apparatuses for Examples 1 and 2. FIG. 19 is a graph showing the results.

As apparent from FIG. 19, the power density in the fuel cell power generating apparatus for Example 1 in which the initial concentration $C^0_m$ was set at 2M was 63 mW/cm$^2$. On the other hand, the power density in the fuel cell power generating apparatus for Example 2 in which the initial concentration $C^0_m$ was set at 1M was 81 mW/cm$^2$. A rapid increase in the output was not obtained by increasing the flow rate $J_m$ to a level four times as high as that for the experiment relating to FIG. 18 in the case of using a methanol aqueous solution having an initial concentration $C^0_m$ of 2M. On the other hand, the power density was substantially doubled in the case of using the methanol aqueous solution having an initial concentration $C^0_m$ of 1M. To be more specific, the power density in the case of using the methanol aqueous solution having an initial concentration $C^0_m$ of 1M was higher than that in the case of using the methanol aqueous solution having an initial concentration $C^0_m$ of 2M. However, if the supply flow rate $J_m$ is increased to 0.8 mL/min, which is higher than the upper limit of the range specified in condition (3) referred to previously, the output of the auxiliary apparatus is increased, with the result that the power density obtained from a prescribed amount of methanol is decreased.

Embodiment 3

Figure 20:
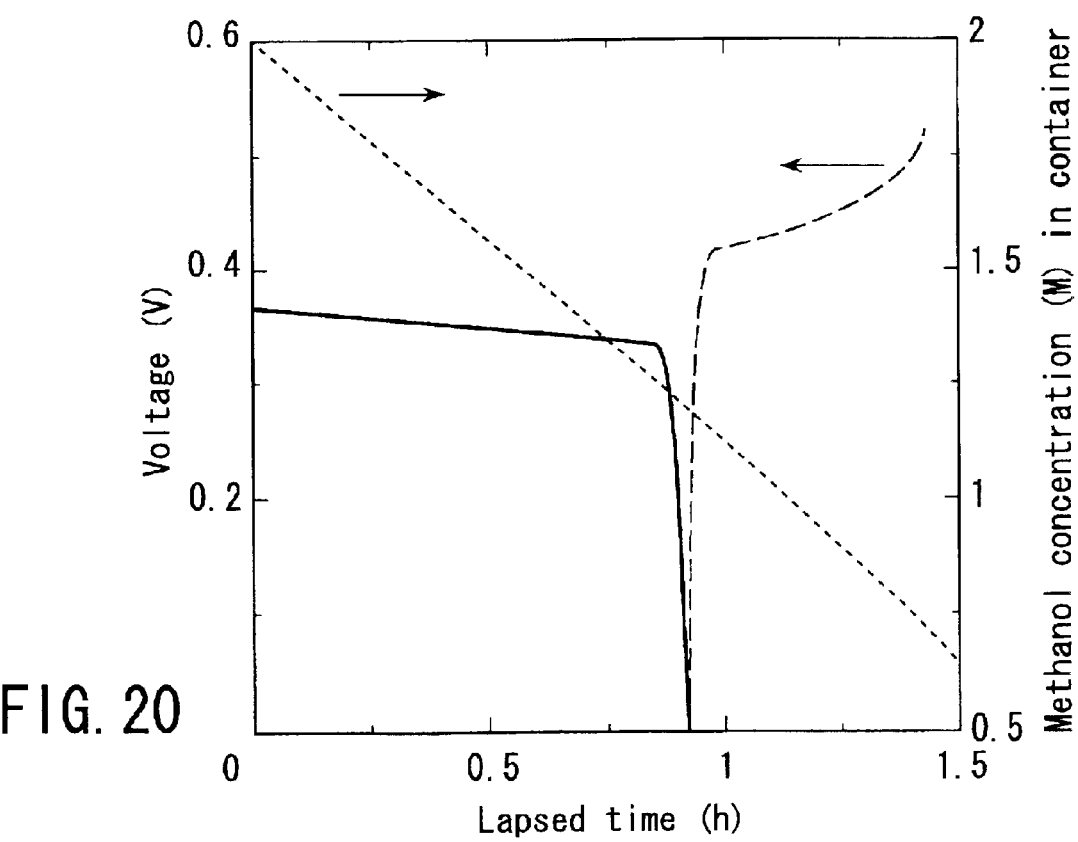
FIG. 20 is a graph showing the results of the measurement in Embodiment 3.

A change in voltage was measured while supplying a load current of 1.5 A by supplying a methanol aqueous solution having an initial concentration $C^0_m$ of 2M to the anode catalyst layer at a flow rate $J_m$ of 0.2 mL/min and by supplying the air to the cathode catalyst layer at a flow rate of 500 mL/min in the direct methanol fuel cell power generating apparatus of Embodiment 1. FIG. 20 is a graph showing the experimental data. In the graph of FIG. 20, the lapsed time (h) is plotted on the abscissa. On the other hand, the concentration $C_m$ (t) (M) of the methanol aqueous solution within the container 10, which was estimated based on the numerical formula 12 given previously, is plotted on the ordinate on the right side, and unit cell voltage (V) is plotted on the ordinate on the left side. As shown in FIG. 20, the cell voltage was retained substantially constant at about 0.37V until the current supply was continued for 50 minutes and, then, the cell voltage was rapidly lowered. The concentration of the methanol aqueous solution estimated by numerical formula 12 given previously was 1.2M. The current-voltage characteristic curve for Example 2, i.e., the case of using the methanol aqueous solution having an initial methanol concentration $C^0_m$ of 1M, shown in FIG. 18 suggested that a methanol fuel shortage would have taken place. Therefore, the flow rate $J_m$ of the methanol aqueous solution was substantially doubled to 0.4 mL/min, with the result that it was possible to set again the load current at 1.5 A and the cell voltage was restored to about 0.45V so as to make it possible to allow the load current to flow further for 30 minutes.

After the measurement, the methanol concentration of the methanol aqueous solution within the methanol aqueous solution container was found to be 0.6M when measured by a gas chromatography. Also, the amount of the methanol aqueous solution remaining in the container was found to be about 9 mL.

Embodiment 4

After completion of the experiment for Embodiment 3, the second methanol aqueous solution container 27 was connected to the methanol aqueous solution container 10 of the fuel cell power generating apparatus via the solution supply pump 28 so as to modify the apparatus to the second direct fuel cell power generating apparatus constructed as shown in FIGS. 13 and 14 referred to previously.

Then, 5 mL of the methanol aqueous solution having a methanol concentration of 15M was housed in the second methanol aqueous solution container 27 having an inner volume of 10 mL, and 1 mL of the methanol aqueous solution was poured from the second methanol aqueous solution container 27 into the first methanol aqueous solution container 10. As a result, 10 mL of the methanol aqueous solution having a methanol concentration of about 2M was housed in the first methanol aqueous solution container 10. The change in voltage was measured while allowing a load current of 1.5 A to flow by supplying the methanol aqueous solution from the first methanol aqueous solution container 10 into the anode catalyst layer with the flow rate $J_m$ of the methanol aqueous solution set at 0.2 mL/min and by supplying the air into the cathode catalyst layer at the flow rate of 500 mL/min. Obtained was a constant voltage of about 0.37V. Then, 1 mL of the methanol aqueous solution was replenished from the second methanol aqueous solution container 27 into the first methanol aqueous solution container 10 at the time when a load current of 1.5 A was allowed to flow for 1 hour and 20 minutes, and a load current of 1.5 A was allowed to flow again. It was possible to drive the fuel cell power generating apparatus continuously for 6 hours and 40 minutes by repeating the above-noted operation 5 times. After the continuous driving of the fuel cell power generating apparatus, the methanol concentration in the first methanol aqueous solution container 10 was found to be about 0.7M when measured by a gas chromatography, and the methanol aqueous solution was found to remain in the first methanol aqueous solution container 10 in an amount of 9 mL. On the other hand, the methanol aqueous solution was scarcely left in the second methanol aqueous solution container 27.

As pointed out above, it was possible to obtain a high power density over a long period of time without renewing the methanol aqueous solution within the first methanol aqueous solution container 10. Also, since the methanol concentration within the second methanol aqueous solution container was high, i.e., 15M, it was possible to diminish the inner volume of the second methanol aqueous solution container.

Embodiment 5

A direct methanol fuel cell power generating apparatus was prepared substantially as in Embodiment 1, except that the thickness L of the anode catalyst layer was set at 50 μm (Example 3). In the fuel cell power generating apparatus for Example 3, the allowable range of the flow rate $J_m$ (mL/min) of the methanol aqueous solution defined by condition (3) referred to previously was: $0.13 \leq J_m \leq 1.0$.

Also, a direct methanol fuel cell power generating apparatus was prepared substantially as in Embodiment 1, except that the thickness L of the anode catalyst layer was set at 75 μm (Example 4). In the fuel cell power generating apparatus for Example 4, the allowable range of the flow rate $J_m$ (mL/min) of the methanol aqueous solution defined by condition (3) referred to previously was: $0.087 \leq J_m \leq 0.69$.

Further, a direct methanol fuel cell power generating apparatus was prepared substantially as in Embodiment 1, except that the thickness L of the anode catalyst layer was set at 100 μm (Example 5). In the fuel cell power generating apparatus for Example 5, the allowable range of the flow rate $J_m$ (mL/min) of the methanol aqueous solution defined by condition (3) referred to previously was: $0.065 \leq J_m \leq 0.52$.

Figure 21:
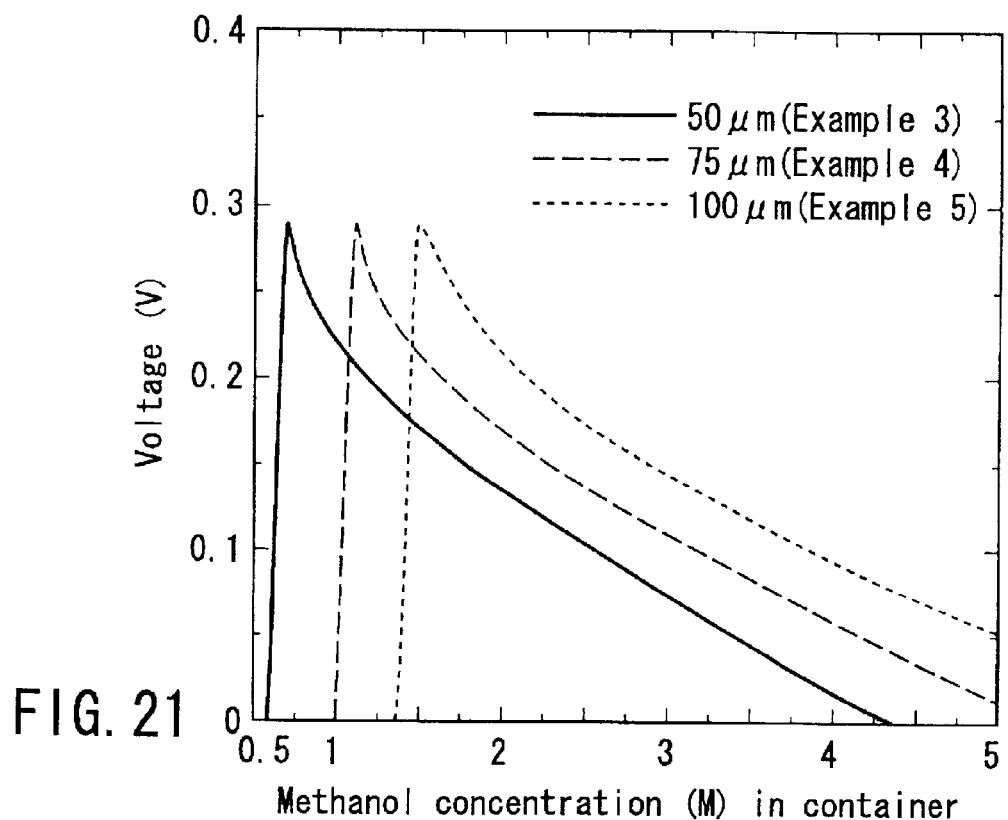
FIG. 21 is a graph showing the results of the measurement in Embodiment 5.

Concerning the direct methanol fuel cell power generating apparatus for Example 3, the methanol aqueous solution was supplied to the anode catalyst layer with the flow rate $J_m$ of the methanol aqueous solution set at 0.4 mL/min, and the air was supplied to the cathode catalyst layer at a flow rate of 500 mL/min so as to measure the battery voltage in the Example of allowing a load current of 3 A to flow through the power generating apparatus. FIG. 21 is a graph showing the experimental data. In the graph of FIG. 21, plotted on the abscissa is the concentration $C^0_m$ (M) of the methanol aqueous solution put first in the methanol aqueous solution container 10, with the unit cell voltage (V) plotted on the ordinate. Incidentally, the initial concentration $C^0_m$ was changed within a range of between 0.5M and 5M, and the cell voltage was measured for each initial concentration.

The cell voltage was measured while allowing a load current of 3 A to flow through the power generating apparatus as in Example 3 given above, except that the flow rate $J_m$ of the methanol aqueous solution was set at 0.3 mL/min for the direct fuel cell power generating apparatus for Example 4, and that the flow rate $J_m$ of the methanol aqueous solution was set at 0.2 mL/min for the direct fuel cell power generating apparatus for Example 5. FIG. 21 also shows the experimental data.

As apparent from FIG. 21, it is possible to drive the direct methanol fuel cell over a wide range of the initial methanol concentration $C^0_m$ ranging between 0.5 and 5M by setting the thickness L of the anode catalyst layer at 40 µm or more. Also, it was possible to obtain a higher cell voltage with decrease in the initial methanol concentration $C^0_m$ like the experimental data given in FIG. 17 referred to previously. Further, it is possible to obtain the cell voltage with a lower methanol concentration as the thickness L of the anode catalyst layer is rendered smaller. It has been confirmed that, where the thickness of the anode catalyst layer is 50 µm (Example 3), the concentration of 0.5M provides the lower limit of the methanol concentration. However, where the thickness of the anode catalyst layer is set at 50 µm, the influence of the cross-over phenomenon is increased. Therefore, if the flow rate $J_m$ is increased to 0.4 mL/min, it is impossible to obtain the cell voltage in the region where the initial methanol concentration $C^0_m$ exceeds 4M. Such being the situation, it has been clarified that, in order to drive the fuel cell, it is necessary to set the flow rate $J_m$ at a level not higher than 0.4 mL/min within the range defined by condition (3) referred to previously. It is desirable to set the initial methanol concentration $C^0_m$ to fall within a range of between 2M and 4M in view of the aspect of suppressing the influence of the cross-over phenomenon.

Incidentally, it is possible to determine the critical load current of the direct methanol fuel cell on the basis of the thickness of the anode catalyst layer and the concentration and the flow rate of the methanol aqueous solution supplied from the methanol aqueous solution container. It follows that it is possible to apply conditions (1) to (3) referred to previously to the direct methanol fuel cell power generating apparatus of the present invention even if the power density of the fuel cell is changed by the electrolyte membrane, by the catalyst and construction of the cathode catalyst layer and by the oxidizing agent flow rate.

Embodiment 6

Prepared was a direct methanol fuel cell power generating apparatus substantially equal to that described previously in conjunction with Embodiment 1, except that the methanol aqueous solution recovery pipe 17 constituting the methanol aqueous solution recovery mechanism was not used such that the methanol aqueous solution discharged from the anode fluid channel 6 was recovered in another route. In the fuel cell power generating apparatus prepared in Embodiment 6, the allowable range of the flow rate $J_m$ (mL/min) of the methanol aqueous solution defined by condition (4) referred to previously is: $0.01575 \leq J_m \leq 0.0619$.

Figure 22:
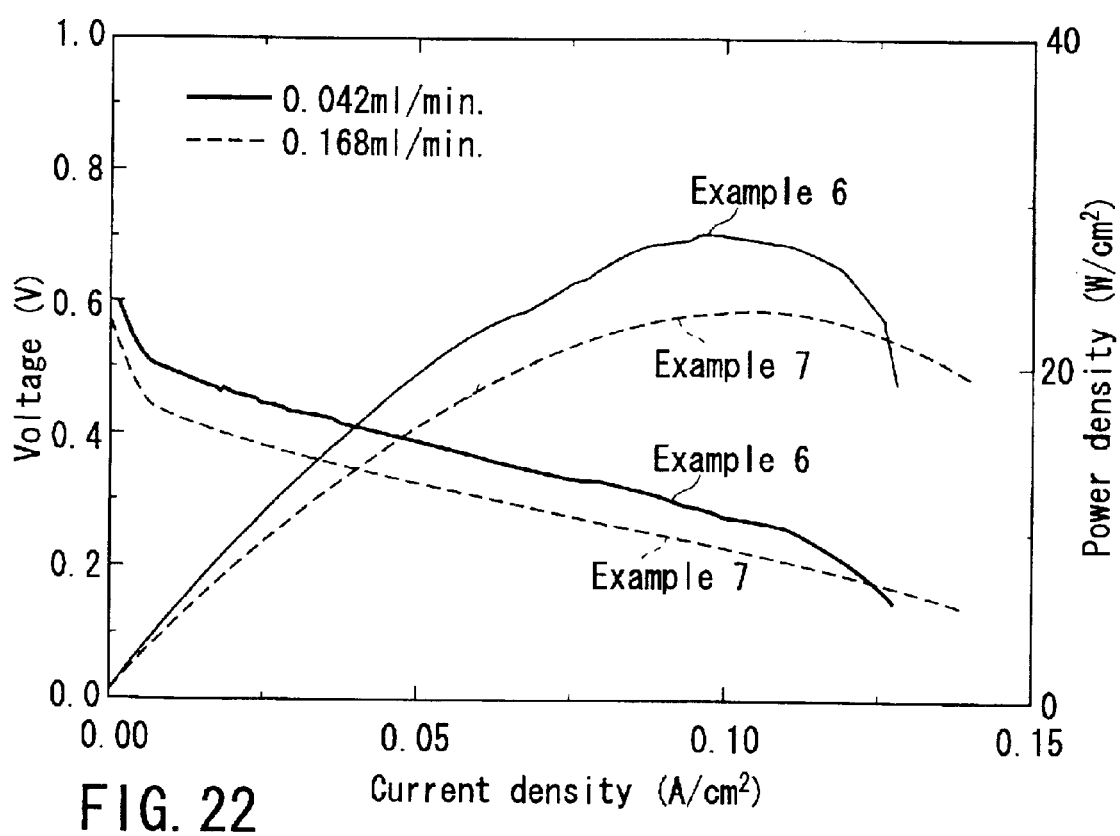
FIG. 22 is a graph showing the results of the measurement in Embodiment 6.

In the direct methanol fuel cell power generating apparatus for Embodiment 6, a methanol aqueous solution having a methanol concentration of 3M was supplied to the anode catalyst layer with the flow rate $J_m$ of the methanol aqueous solution set at 0.042 mL/min, and the air was supplied to the cathode catalyst layer at the flow rate of 200 mL/min (Example 6). On the other hand, a methanol aqueous solution having a methanol concentration of 3M was supplied to the anode catalyst layer with the flow rate $J_m$ of the methanol aqueous solution set at 0.168 mL/min, and the air was supplied to the cathode catalyst layer at the flow rate of 200 mL/min (Example 7). The current-voltage characteristics of these Examples 6 and 7 were measured. FIG. 22 is a graph showing the experimental data.

As apparent from FIG. 22, the power density for the fuel cell power generating apparatus for Example 6, in which the flow rate $J_m$ of the methanol aqueous solution was set low at 0.042 mL/min, was higher than that for Example 7. The experimental data support FIG. 6 calculated for deriving condition (4). To be more specific, it has been confirmed that, if the flow rate $J_m$ of the methanol aqueous solution supplied from the methanol aqueous solution container into the electromotive section is set to fall within the range defined by condition (4), the peak of the power density appears in the Example where the methanol concentration of the methanol aqueous solution housed in the container falls within a range of between 2M and 5M. It is considered reasonable to interpret that the power density was increased because the cross-over overvoltage generated within the cathode catalyst layer was lowered.

Figure 23:
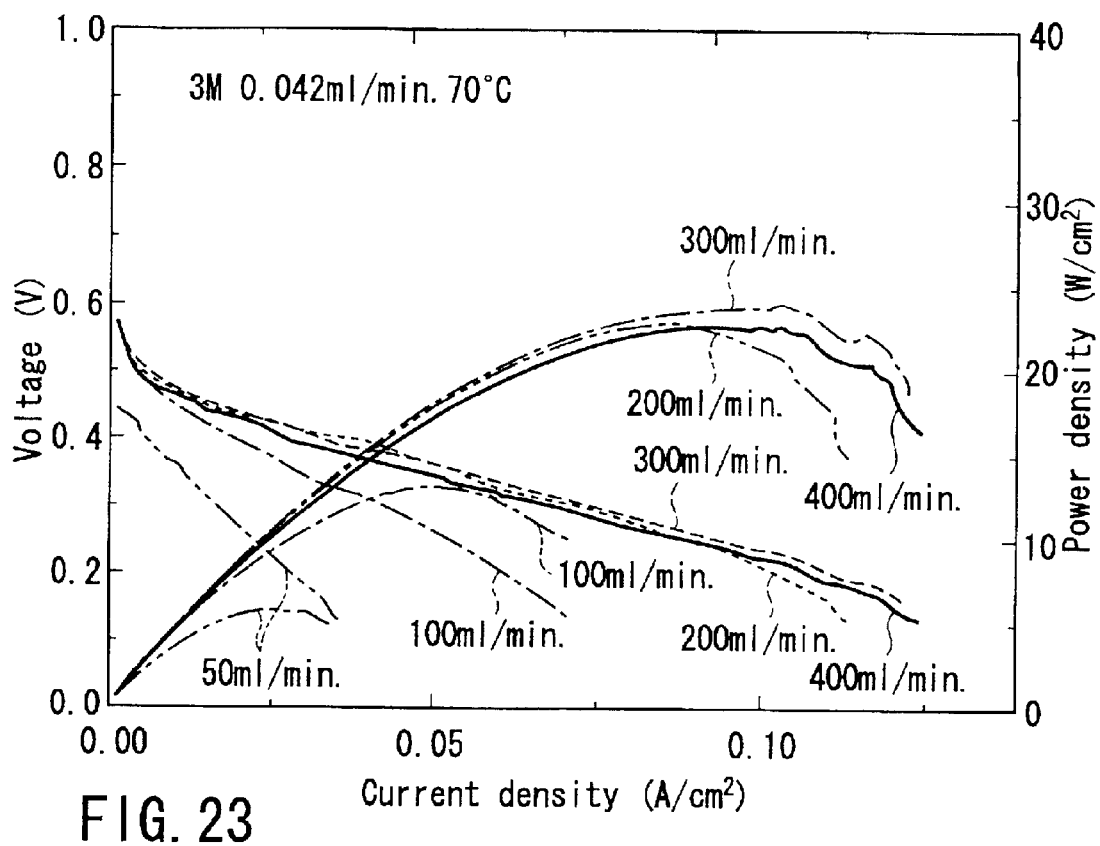
FIG. 23 is a graph showing the relationship among the unit cell voltage, the current density and the power density, covering the case where the air flowing speed in the direct methanol fuel cell power generating apparatus in Example 6 was changed.

Further, the change in the current-voltage characteristics was measured, covering the Examples where the air flow rate was set at 50 mL/min, 100 mL/min, 200 mL/min, 300 mL/min or 400 mL/min with the flow rate $J_m$ of the methanol aqueous solution fixed to 0.042 mL/min or 0.168 mL/min. FIG. 23 is a graph showing the experimental data, covering the case where the flow rate $J_m$ of the methanol aqueous solution was set at 0.042 mL/min, and FIG. 24 is a graph showing the experimental data, covering the case where the flow rate $J_m$ of the methanol aqueous solution was set at 0.168 mL/min.

As apparent from FIG. 23, it has been confirmed that the output is saturated when the air flow rate is set at 200 mL/min in the Example where the flow rate $J_m$ of the methanol aqueous solution is set at 0.042 mL/min. On the other hand, FIG. 24 shows that the output is not completely saturated even when the air flow rate is increased to 400 mL/min in the case where the flow rate $J_m$ of the methanol aqueous solution is set at 0.168 mL/min. In addition, the power density in this case was found to be lower than that in the case where the flow rate $J_m$ of the methanol aqueous solution is set at 0.042 mL/min.

Figure 24:
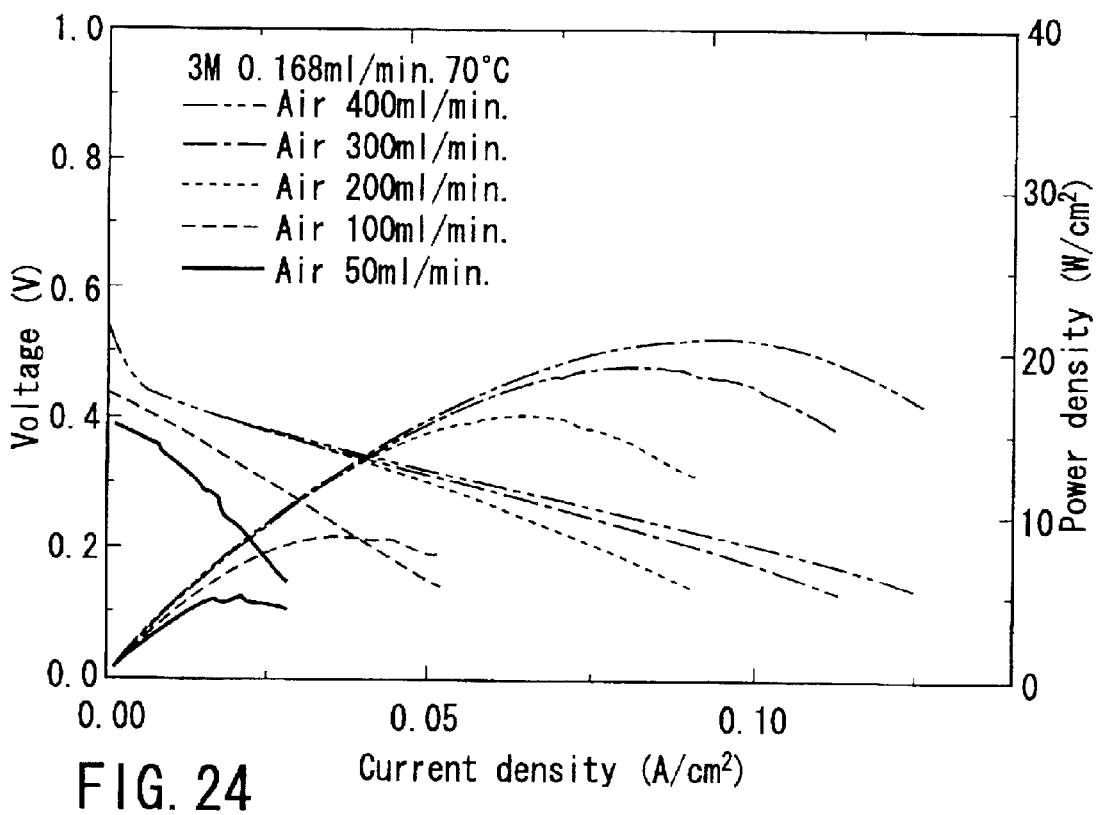
FIG. 24 is a graph showing the relationship among the unit cell voltage, the current density and the power density, covering the case where the air flowing speed in the direct methanol fuel cell power generating apparatus in Example 7 was changed.

As apparent from the experimental data given in FIGS. 22 to 24, the direct methanol fuel cell power generating apparatus for Example 6 is capable of achieving the highest power density that can be achieved with a low air flow rate and a low flow rate $J_m$ of the methanol aqueous solution so as to make it possible to obtain a high energy conversion efficiency.

Further, the fuel utilization factor η was calculated on the basis of the numerical formula given below in respect of the current density set at 0.1 A/cm² for the fuel cell power generating apparatus for each of Examples 6 and 7. The fuel utilization factor η of the fuel cell power generating apparatus for Example 6 was found to be 82%, and the fuel utilization factor η of the fuel cell power generating apparatus for Example 7 was found to be 20%. In other words, the fuel cell power generating apparatus for Example 6 permits achieving fuel utilization factor η more than 4 times as high as that for the fuel cell power generating apparatus for Example 7 so as to make it unnecessary to circulate the methanol aqueous solution on the anode side.

$$\text{Fuel Utilization Factor } \eta = (10^4 J)/(FC v_1)$$

where J denotes the current density (A/cm²), C denotes the concentration (M) of the methanol aqueous solution, F denotes the Faraday constant (96485 C/mol), and $v_1$ denotes the methanol aqueous solution flow rate per unit area (mL/min/cm²).

It follows that it is possible to realize a direct methanol fuel cell power generating apparatus excellent in both the energy conversion efficiency and the fuel utilization factor, if the methanol concentration of the methanol aqueous solution is set to fall within a range of between 2M and 5M, and if the flow rate $J_m$ at which the methanol aqueous solution is supplied from the container is set to fall within the range defined by condition (4) referred to previously.

Incidentally, as the method of supplying the fuel of the methanol aqueous solution to the anode electrode of the direct methanol fuel cell, known is an inner evaporation method as well as the method of using a pump as employed in the embodiment described above. In the inner evaporation method, a methanol aqueous solution is introduced into the fuel permeating section by utilizing a capillary phenomenon, followed by evaporating the methanol aqueous solution by utilizing as a main heat source the heat generated by the electrode reaction carried out in the electromotive section. In this case, the evaporated methanol aqueous solution is supplied to the anode electrode.

However, if the fuel is supplied by the inner evaporation method, the flow rate of the methanol supply per unit area and per unit time is about 10 mL/min/cm², which is about hundreds of times as high as the flow rate calculated from condition (3), i.e., {N×(5.2/L)×S}. As a result, it is possible to obtain a high power density in the fuel cell. However, since the output of the auxiliary apparatus is increased, the energy conversion efficiency is rendered low. Also, in the inner evaporation method, methanol is kept supplied to the anode electrode even while the power generation of the fuel cell is interrupted, so as to give rise to the problem that the methanol cross-over tends to take place easily.

As described above in detail, the present invention provides a fuel cell power generating apparatus and a combined battery, which permit diminishing the inner volume of the liquid fuel container and also permit obtaining a high output.

The present invention also provides a method of operating a fuel cell power generating apparatus, which permits satisfying simultaneously both the energy conversion efficiency and the power density.

Further, the present invention provides a fuel cell power generating apparatus and a combined battery excellent in both the fuel utilization factor and the energy conversion efficiency.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell power generating apparatus, comprising:
an electromotive section comprising at least one electromotive section unit, said at least one electromotive section unit including an anode electrode comprising an anode catalyst layer, a cathode electrode and an electrolyte membrane arranged between said anode electrode and said cathode electrode;
a container containing a methanol aqueous solution;
an anode fluid channel through which the methanol aqueous solution is supplied to said anode electrode;
a methanol aqueous solution recovery mechanism configured to bring back the excess portion of the methanol aqueous solution supplied to said anode fluid channel to said container to recover the excess portion therein; and
a flow rate controller which controls the flow rate $J_m$ (mL/min) at which the methanol aqueous solution is supplied from said container, in accordance with an evaluated concentration of the methanol aqueous solution within said container, said evaluated concentration being obtained by evaluating the record of the change with operating time in the load current of the fuel cell power generating apparatus, wherein said fuel cell power generating apparatus satisfies conditions (1) to (3) given below:

$$2 \leq C_m^0 \leq 5 \quad (1)$$

$$L \geq 40 \quad (2)$$

$$N \cdot 0.65/L \cdot S \leq J_m \leq N \cdot 5.2/L \cdot S \quad (3)$$

where $C_m^0$ represents the initial concentration (M) of the methanol aqueous solution in said container, L represents the thickness (μm) of said anode catalyst layer, S represents the reaction area (cm²) of said anode catalyst layer, and N represents the number of the electromotive section units.

2. The fuel cell power generating apparatus according to claim 1, which further comprises at least two pumps connected to said container, and in which the flow rate $J_m$ (mL/min) is a total amount of the methanol aqueous solution that said at least two pumps supply per minute.

3. The fuel cell power generating apparatus according to claim 1, which further comprises a pump connected to said container, and in which the flow rate $J_m$ (mL/min) is an amount of the methanol aqueous solution that said pump supplies per minute.

4. The fuel cell power generating apparatus according to claim 1, further comprising a methanol replenishing container which contains a methanol aqueous solution of a higher concentration than the initial concentration $C_m^0$ (M) and from which the methanol aqueous solution of the higher concentration is supplied into said container.

5. The fuel cell power generating apparatus according to claim 1, wherein the thickness L of said anode catalyst layer falls within a range of between 40 μm and 150 μm.

6. The fuel cell power generating apparatus according to claim 1, wherein said evaluated concentration is represented by $C_m(t)$ given below:

$$C_m(t) = \left( C_m^0 V - \frac{1}{6F} \int_0^t dt' I(t') \right) \Big/ \left[ \left( C_m^0 V - \frac{1}{6F} \int_0^t dt' I(t') \right) V_m + \left( \frac{1 - C_m^0 V_m}{V_w} V - \frac{1}{6F} \int_0^t dt' I(t') \right) V_w \right]$$

where $C_m^0$ denotes the initial concentration (M) of the methanol aqueous solution in said container, $V_m$ represents the molar volume of methanol, $V_w$ denotes the molar volume of water, V denotes the volume of said container, I(t') denotes the load current at time t, and F denotes the Faraday constant (96485 C/mol).

7. A combined battery, comprising the fuel cell power generating apparatus defined in claim 1 and a nonaqueous electrolyte secondary battery electrically connected to said fuel cell power generating apparatus.

8. A fuel cell power generating apparatus, comprising:
an electromotive section comprising at least one electromotive section unit, said at least one electromotive section unit including an anode electrode comprising an anode catalyst layer having a thickness not smaller than 40 μm, a cathode electrode and an electrolyte membrane arranged between said anode electrode and said cathode electrode; and
a container containing a methanol aqueous solution having a concentration falling within a range of between 2M and 5M,
wherein the flow rate $J_m$ (mL/min) at which the methanol aqueous solution is supplied from said container falls within a range defined by condition (4) given below:

$$N \cdot 1.5 \times 10^{-5} \cdot L \cdot S \leq J_m \leq N \cdot 0.65/L \cdot S \quad (4)$$

where L denotes the thickness ($\mu$m) of said anode catalyst layer, S denotes the reaction area (cm$^2$) of said anode catalyst layer, and N denotes the number of the electromotive section units.

9. The fuel cell power generating apparatus according to claim 8, which further comprises at least two pumps connected to said container, and in which the flow rate $J_m$ (mL/min) is a total amount of the methanol aqueous solution that said at least two pumps supply per minute.

10. The fuel cell power generating apparatus according to claim 8, which further comprises a pump connected to said container, and in which the flow rate $J_m$ (mL/min) is an amount of the methanol aqueous solution that said pump supplies per minute.

11. The fuel cell power generating apparatus according to claim 8, wherein the thickness of said anode catalyst layer falls within a range of between 40 $\mu$m and 150 $\mu$m.

12. A combined battery, comprising the fuel cell power generating apparatus defined in claim 8 and a nonaqueous electrolyte secondary battery electrically connected to said fuel cell power generating apparatus.

13. A method of operating a fuel cell power generating apparatus comprising an electromotive section comprising at least one electromotive section unit, said at least one electromotive section unit including an anode electrode comprising an anode catalyst layer having a thickness not smaller than 40 $\mu$m, a cathode electrode and an electrolyte membrane arranged between said anode electrode and said cathode electrode; a container containing a methanol aqueous solution having an initial concentration of 2M to 5M; an anode fluid channel through which the methanol aqueous solution is supplied to said anode electrode; a methanol aqueous solution recovery mechanism configured to bring back the excess portion of said methanol aqueous solution supplied to said anode fluid channel to said container to recover the excess portion therein; and a methanol concentration evaluating mechanism which evaluates the concentration of the methanol aqueous solution in said container from the record of the change with operating time in the load current of the fuel cell power generating apparatus, said method comprising:

performing a first power generating operation to obtain electric power from said fuel cell power generating apparatus when the evaluated concentration falls within a range of between 2M and 5M while maintaining the flow rate $J_m$ (mL/min) at which the methanol aqueous solution is supplied from said container at a constant value falling within a range defined by condition (3) given below; and performing a second power generating operation to obtain electric power from said fuel cell power generating apparatus when said evaluated concentration is lowered to a value lower than 2M while increasing the flow rate $J_m$ (mL/min) within the range defined by condition (3):

$$N \cdot 0.65/L \cdot S \leq J_m \leq N \cdot 5.2/L \cdot S \quad (3)$$

where L denotes the thickness of said anode catalyst layer, S denotes the reaction area (cm$^2$) of said anode catalyst layer, and N denotes the number of the electromotive section units.

14. The method of operating the fuel cell power generating apparatus according to claim 13, wherein said evaluated concentration is represented by $C_m(t)$ given below:

$$C_m(t) = \left(C_m^0 V - \frac{1}{6F}\int_0^t dt' I(t')\right) \Big/ \left[\left(C_m^0 V - \frac{1}{6F}\int_0^t dt' I(t')\right)V_m + \left(\frac{1-C_m^0 V_m}{V_w}V - \frac{1}{6F}\int_0^t dt' I(t')\right)V_w\right]$$

where $C^0_m$ denotes the initial concentration (M) of the methanol aqueous solution in said container, $V_m$ represents the molar volume of methanol, $V_w$ denotes the molar volume of water, V denotes the volume of said container, I(t') denotes the load current at time t, and F denotes the Faraday constant (96485 C/mol).

15. The method of operating the fuel cell power generating apparatus according to claim 13, wherein the thickness of said anode catalyst layer falls within a range of between 40 $\mu$m and 150 $\mu$m.

16. The method of operating the fuel cell power generating apparatus according to claim 13, further comprising replenishing an methanol aqueous solution to said container when said evaluated concentration is lowered to a level lower than 0.5M so as to increase said evaluated concentration to a level not lower than 0.5M.

17. The method of operating the fuel cell power generating apparatus according to claim 16, wherein said replenishment of said methanol aqueous solution is performed until said evaluated concentration is increased to fall within a range of not lower than 0.5M and less than 2M while performing said second power generation.

18. The method of operating the fuel cell power generating apparatus according to claim 16, wherein said methanol aqueous solution is replenished such that, while performing said second power generation until said evaluated concentration falls within a range of not lower than 0.5M and less than 2M, said second power generation is switched to said first power generation when said evaluated concentration has increased to reach 2M, and, while performing said first power generation, said methanol aqueous solution is replenished until said evaluated concentration is increased to reach 5M.

* * * * *